United States Patent [19]
Anderson et al.

[11] Patent Number: 5,844,807
[45] Date of Patent: Dec. 1, 1998

[54] AUTOMATED SYSTEM AND METHOD FOR OPTIMIZING AND PALLETIZING ARTICLES

[75] Inventors: Wade A. Anderson, Madison; Shayne A. Roberts, Phillips; John J. Kondratuk, Kennan, all of Wis.

[73] Assignee: Marquip, Inc., Phillips, Wis.

[21] Appl. No.: 556,207

[22] Filed: Nov. 9, 1995

[51] Int. Cl.⁶ .................................................. G06F 17/00
[52] U.S. Cl. ................................ 364/478.05; 414/792.6; 414/789.6; 414/791.8; 414/902
[58] Field of Search ...................... 364/478.02, 478.05, 364/478.06; 414/792.6, 789.6, 789.9, 789.8, 789.5, 791.6, 791.8, 799, 786, 902, 794.7, 907

[56] References Cited

U.S. PATENT DOCUMENTS

| | | | |
|---|---|---|---|
| 2,699,264 | 1/1955 | Bruce et al. | 414/788.9 |
| 2,997,187 | 8/1961 | Burt | 198/412 |
| 4,255,074 | 3/1981 | Meratti et al. | 414/62 |
| 4,352,616 | 10/1982 | Brenner | 414/31 |
| 4,641,271 | 2/1987 | Konishi et al. | 364/478.05 |
| 5,050,090 | 9/1991 | Golub et al. | 364/478.05 |
| 5,139,388 | 8/1992 | Martin | 414/799 |
| 5,372,472 | 12/1994 | Winski et al. | 414/786 |
| 5,540,545 | 7/1996 | Roberts et al. | 414/792.6 |

FOREIGN PATENT DOCUMENTS

3107495   2/1981   Germany ..................... B65G 57/24

*Primary Examiner*—Reba I. Elmore
*Assistant Examiner*—Steven R. Garland
*Attorney, Agent, or Firm*—Andrus, Sceales, Starke & Sawall

[57] ABSTRACT

A method and apparatus is disclosed for optimizing an arrangement of articles, such as stacks of paperboard sheets, into horizontal tiers, then stacking the horizontal tiers one on top another to form a rectangular-shaped unit, wherein the rectangular shaped unit has base dimensions substantially equal to a selected standard pallet-type. The system includes a computer programmed to receive the base size of an article, the total number of articles desired, and a selected pallet type. The computer is connected to a palletizer for building the actual unit of articles consistent with an optimized unit configuration. The palletizer has a tier forming station in which tiers of articles are formed according to the selected tier configuration, and a transfer device for moving the formed tiers into a stack forming station wherein the tiers are sequentially deposited. The system can add spacing between selected articles in a tier, and stack the tiers such that the spaces in adjoining tiers are not aligned.

15 Claims, 19 Drawing Sheets

AUTOMATED SYSTEM AND METHOD FOR OPTIMIZING AND PALLETIZING ARTICLES

BACKGROUND OF THE INVENTION

The present invention pertains to an automated system and method for optimizing and palletizing articles, or the formation of stacks comprising ordered layers of such articles, which articles may themselves comprise layered stacks.

Palletizing systems are well known in the prior art and are utilized to build large, generally prismatic stacks of articles into a compact arrangement for shipping. The articles which are palletized also typically have a rectangular prismatic shape and may themselves comprise either unitary packages or stacks of identical layered items. Each palletized stack typically comprises multiple layers or tiers, stacked one atop another, each of which tiers comprises a plurality of rows of articles. The stacks are generally formed on and supported by a shipping pallet, but may be formed directly on a conveyor bed or other transfer mechanism.

For palletizing systems which are designed to handle articles of different sizes and shapes, it is generally desirable to form stacks having the same outside dimensions, particularly around the perimeter, so that the stacks substantially conform to the area of the pallets on which they are formed, provide uniformity in size and shape for shipping and storage, and can be wrapped or banded with equipment and materials operated in a uniform manner. Thus, it is often desirable or necessary to form tiers of articles in which there are gaps or spaces between adjacent articles or adjacent rows of articles in order that the tier assumes the shape of the outer perimeter of the stack being formed. For space and shape optimization, it is also often necessary to rotate articles 90° about a vertical axis with respect to other articles forming a tier or one of the tier-forming rows.

U.S. Pat. Nos. 2,699,264; 2,997,187; 4,255,074; 4,352,616 and 5,139,388 all disclose systems for forming stacks of articles from multi-article tiers placed one atop another. In each of the foregoing patents, the individual articles are first formed in rows and a plurality of rows are assembled to form a tier. The tiers are sequentially placed atop a pallet or previously deposited tier, or in the case of the system disclosed in U.S. Pat. No. 2,997,187, each tier is inserted beneath a previously positioned tier or stack of tiers. Each of the foregoing patents disclose some means for reorienting or spacing articles with respect to adjacent articles in a row or in a tier.

However, in all of the above identified prior art systems, an operator must create an arrangement pattern of the articles and their orientation on a pallet. None of these systems are capable of automatically optimizing the arrangement of articles to provide choices for the most efficient use of pallets.

SUMMARY OF THE INVENTION

In accordance with the present invention, a computer implemented palletizing system for optimizing an arrangement of articles, such as vertical stacks of layered paper products, into horizontal tiers, and vertically arranging the horizontal tiers into at least one rectangular-shaped unit for shipping on a standard pallet includes, a computer programmed to receive an article size, a total number of articles desired, and a selected standard pallet type to arrange the articles into horizontal tiers. The computer is programmed to generate multiple possible tier configurations having base dimensions substantially equal to the selected standard pallet size and thereafter vertically stacking tier configurations to form a rectangular-shaped unit configuration. The system also includes a computer monitor connected to the computer for displaying the possible tier configuration and the unit configuration. The computer is connected to a palletizer for building at least one unit of articles consistent with the unit configuration. The palletizer includes a stack forming station on which the tiers are sequentially deposited, a tier forming station in which tiers of articles are formed, and a transfer device for moving the formed tiers to the stack forming station.

The system also includes an input means, such as a keyboard, for an operator to enter a length and width of a single article and a total number of articles desired. The computer monitor is preferably a touch sensitive monitor having selected inputs. One of the inputs on the computer monitor allows an operator to select a standard pallet type from a list of pallet types stored in memory. The computer then generates the possible tier configurations based upon the entered length and width of a single article, the total number of articles desired, and the pallet type selected. The computer is programmed to generate either or both rotated and unrotated rows of articles in any given tier configuration, and provide spacing, where necessary, between selected articles within the rows to form a tier with base dimensions substantially equal to that of the selected pallet type.

Preferably, there are two tier forming stations positioned on opposite sides of the stack forming station, a first tier forming station in which first tiers of articles are formed, and a second tier forming station in which second tiers of articles are formed. The palletizing system further includes a first conveyor system on which articles or rows of articles are moved serially into the first tier forming station, and a second conveyor system on which articles or rows of articles are moved serially into the second tier forming station. Each of the conveyor systems preferably comprise an in-feed conveyor, a tier forming station conveyor which is operatively connected to the downstream end of the in-feed conveyor and adapted to received articles therefrom, and an article orienting device which is operatively connected to the upstream end of the in-feed conveyor and is adapted to selectively position articles for placement on the in-feed conveyor. Each in-feed conveyor and its associated tier forming station conveyor are operative to form rows of articles, and the latter is operative to form tiers of a plurality of rows of articles.

In the preferred embodiment of the invention, each of the first and second tier forming stations includes means for sequentially forming rows of articles, and means for sequentially forming tiers from said sequentially formed rows. The tier forming means includes transfer means for moving each tier into the stack forming station.

Another aspect of the present invention includes a method of optimizing and automatically forming a desired number of articles into horizontal tiers, and forming the horizontal tiers into at least one rectangular unit. The rectangular unit is formed to have base dimensions substantially similar to those of a chosen standard pallet type. The method includes the steps of inputting a length and width of a single article and a total number of articles desired into a programmed computer, selecting a pallet type from a listing of standard pallet types stored in a memory of the program computer, and generating multiple possible tier configurations. The tier configurations generated are based on the length and width of an article input, the total number of articles desired input, and the pallet type selected. The method also includes selecting one or more tier configurations and stacking the selected tier configurations to form a unit configuration. The invention then forms an actual unit of articles based on the unit configuration, wherein the actual unit has base dimensions substantially similar to those of the selected pallet type.

Preferably, the method also includes the steps of ranking the possible tier configurations based on the number of articles in a tier, displaying a visual representation of the possible tier configurations on a monitor, permitting an operator to select a displayed possible tier configuration to form a unit configuration, and displaying a visual representation of the formed unit configuration on the monitor prior to forming an actual unit.

The method can also include the steps of rotating a given number of articles to form a row of rotated articles, selectively spacing a rotated article within the row of rotated articles, forming a row of unrotated articles, and selectively spacing an unrotated article within the row of rotated articles. This method then allows the forming of horizontally asymmetrically different tiers on opposite sides of a stack forming station, and alternately transferring the horizontally asymmetric tiers from the opposite sides into the stack forming station such that the selective spacing between articles in each tier are not aligned with the selective spacing of a previous tier and a subsequent tier.

Yet another aspect of the invention includes a system for optimizing a desired number of articles into horizontal tiers, and the horizontal tiers into at least one rectangular unit of size corresponding to a standard pallet type including: means for inputting a base size of an article and a total number of articles ordered, means for selecting a pallet type from a list of standard pallet types, means for generating multiple possible tier configurations based on the base size of an article, the total number of articles ordered, and the selected pallet type, means for selecting a tier configuration from the generated possible tier configurations, means for stacking selected tier configurations to form a rectangular unit configuration, means for forming a tier of articles corresponding to the selected tier configuration, and a means for sequentially depositing formed tiers of articles in a unit forming station to form a unit corresponding to the unit configuration.

DETAILED DESCRIPTION OF THE PREFERRED EMBODIMENT

Figure 1:
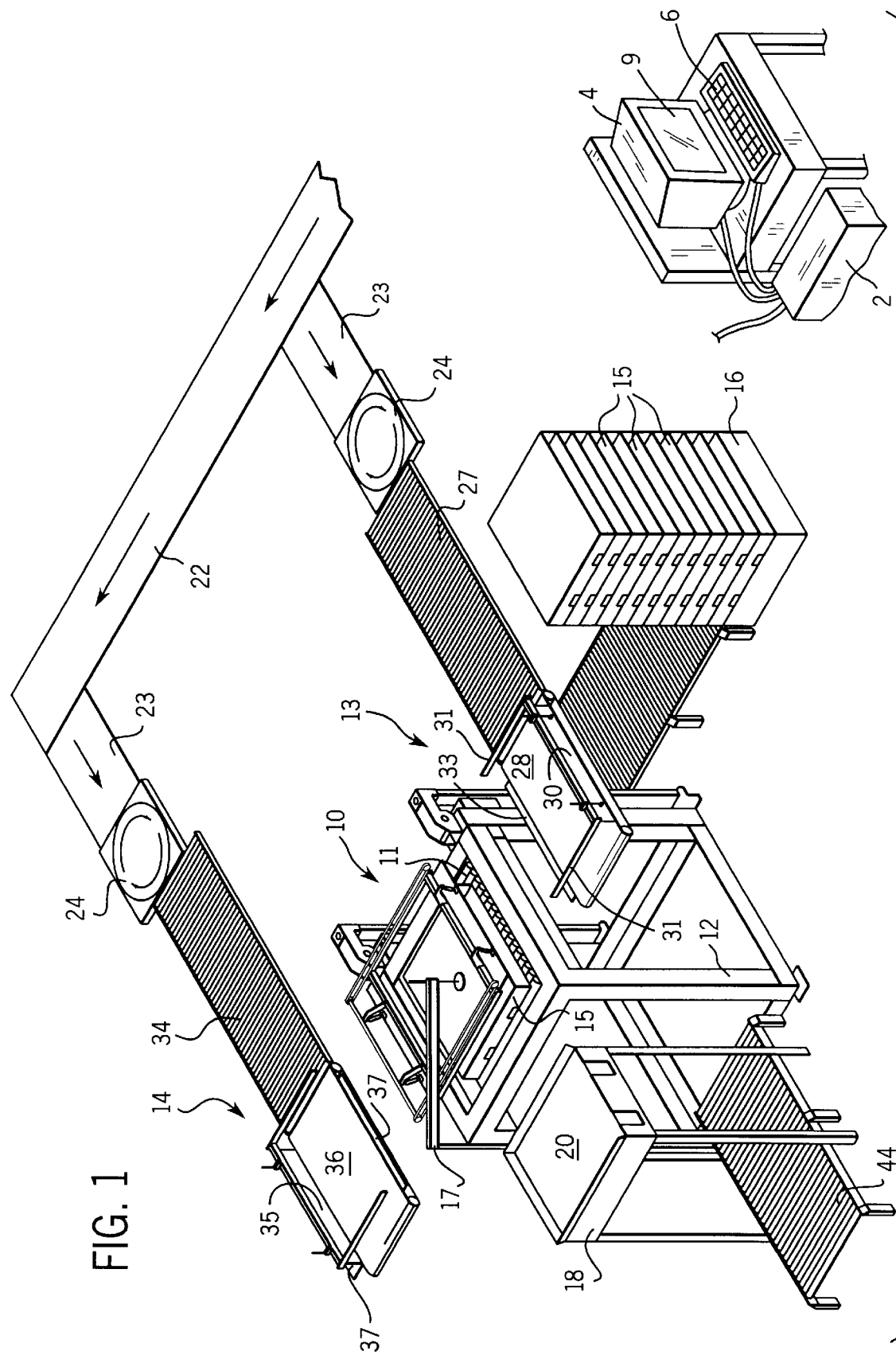
FIG. 1 is a perspective view of the optimizing and palletizing system of the present invention.
Figure 20:
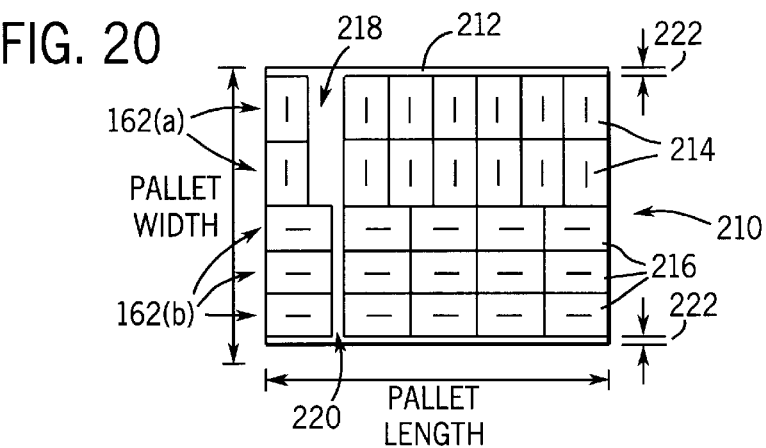
FIG. 20 is a top plan view of a tier of articles arranged on a pallet according to one aspect of the present invention.
Figure 21:
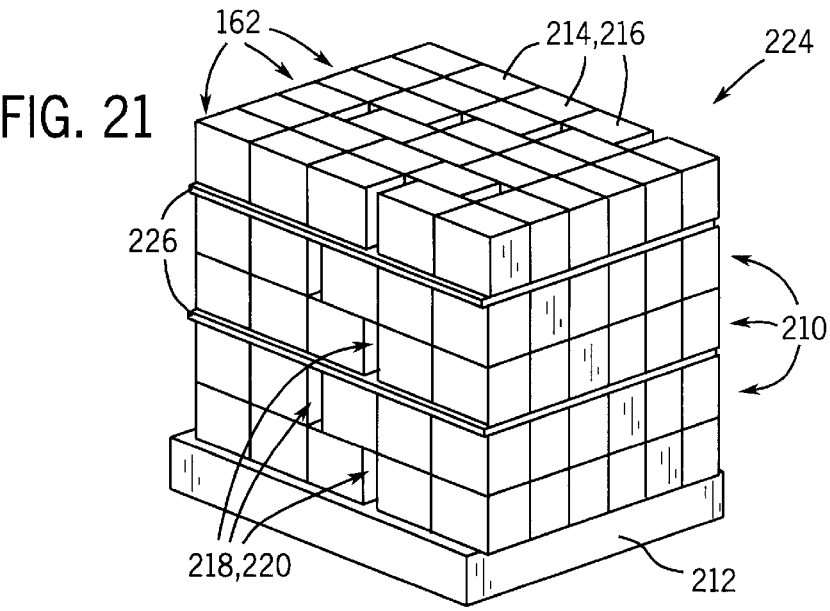
FIG. 21 is a perspective view of a unit of articles arranged on a pallet in accordance with the invention.

FIG. 1 shows a computer implemented palletizing system for optimizing an arrangement of articles into tiers, and the tiers into at least one rectangular shaped unit for shipping on a standard pallet in an arrangement as exemplary shown in FIG. 21. FIG. 1 shows a computer 2 programmed in accordance with the description of FIGS. 19–23. The computer 2 is connected to a computer monitor 4, a keyboard 6, and a palletizer 8. Preferably, the computer monitor 4 has a touch sensitive screen 9 in accordance with the description of FIGS. 19(a)–(f). The computer 2 is connected to the palletizer 8 in a manner well known in the art, utilizing commonly known controllers and photoeyes.

The palletizer 8 includes a centrally located stacking station 10 in which a pallet-supporting platform 11 is supported for vertical movement within an open frame 12. The stacking station 10 is positioned between a first tier forming station 13 and a second tier forming station 14 from which layered tiers of articles are alternately transferred into the stacking station 10 for placement atop one another to form a stack of multiple tiers on the pallet supporting platform 11. Preferably, the stack is formed directly on a pallet 15 which is initially placed on the supporting platform 11 from an automatic pallet feeder 16. With the pallet supporting platform 11 in its lowermost position within the open frame 12, a pallet 15 is delivered to the platform which is then raised to its uppermost position, shown in FIG. 1, for the start of a stacking sequence. The system may also include a tie sheet feeder 17 which transfers a tie sheet 20 from a supply bin 18 to the top of the pallet 15 and each tier of articles moved into the stacking station to separate adjacent tiers, as is well known in the art. The tie sheet feeder 17 may utilize a rotary arm to carry a sheet from the bin 18 to the pallet 15 or may use a linear feed system.

Figure 18:
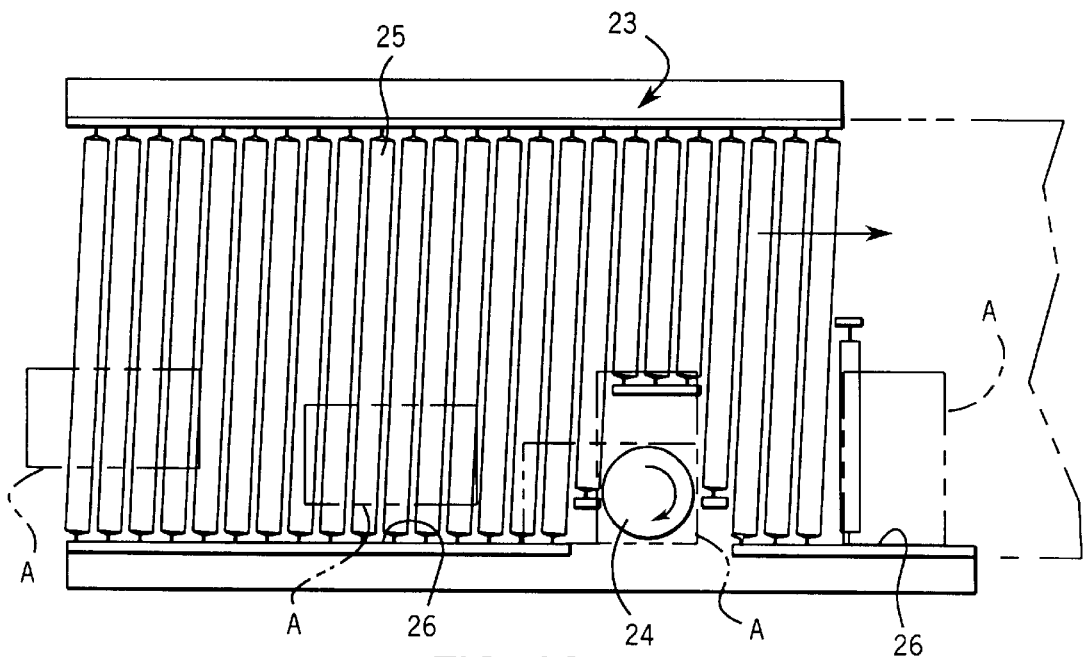
FIG. 18 is a top plan view of a rotating device used to provide 90° reorientation of selected articles in a formed row.

The articles A to be palletized may be supplied from a single source by a supply conveyor system 21 which may include a cross conveyor 22 operating between a feed conveyor 23 for each tier forming station 13 and 14. Each feed conveyor 23 supplies articles A one at a time to an article orienting device in the form of a turntable or article rotator 24. As indicated previously, the articles A typically have a rectangular prismatic shape and may be either unitary boxes or stacks of layered items, such as sheets of paperboard, books, or the like. Regardless of the specific nature of the articles A, each feed conveyor 23 operates to orient one side face of the article in a common vertical plane as it is conveyed onto the article rotator 24. Further, if the article is reoriented by the rotator, as by turning the article 90° about a vertical axis, the reoriented side face of the article must also be maintained in the same common vertical plane. FIG. 18 shows a generally schematic top plan view of a combined feed conveyor 23 and article rotator 24. The feed conveyor 23 preferably comprises a live roller conveyor in which the driven live rollers 25 are mounted on a skew, such that articles delivered to the conveyor from the cross conveyor 22 will be driven into a vertical side wall 26 which lies in the above described common vertical plane.

Figure 2:
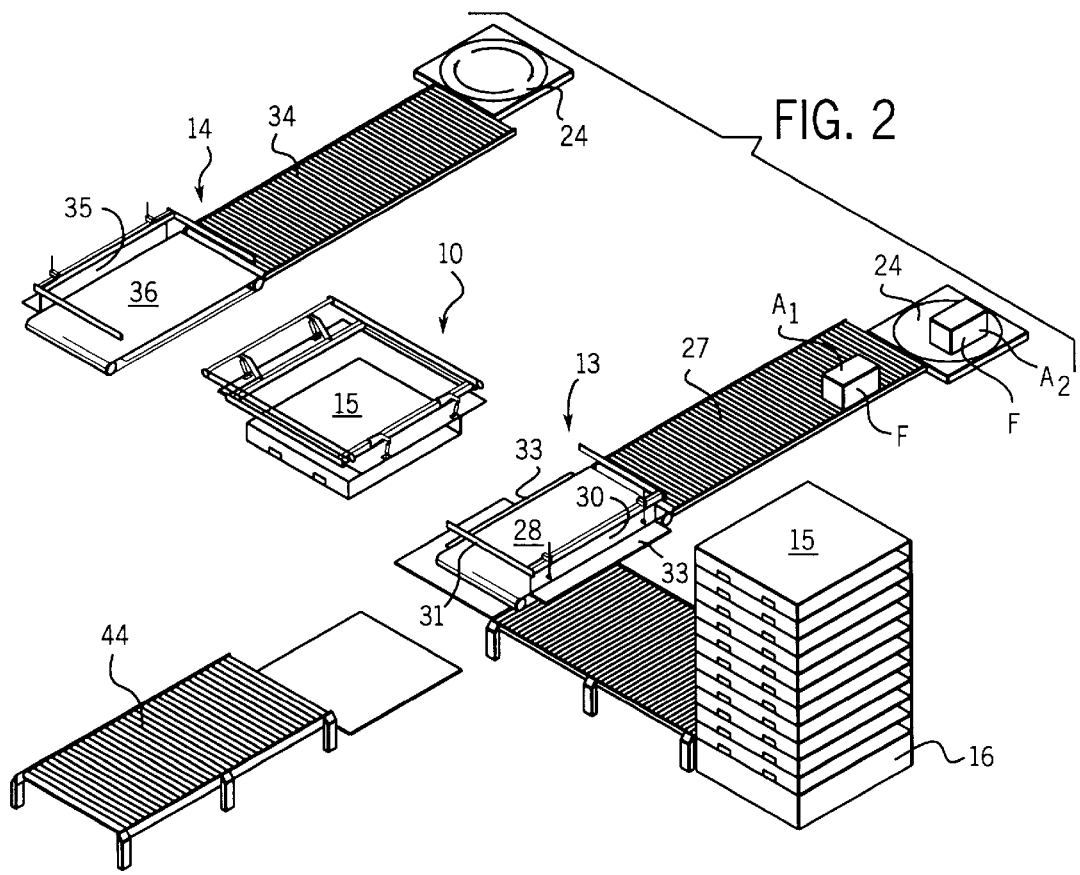
FIGS. 2–15 are somewhat simplified views of a portion of the system shown in FIG. 1 showing various stages of operation of the palletizing system.

In FIG. 2, the first article $A_1$ is shown moving along a first in-feed conveyor 27 of the first tier forming station 13. Article $A_1$ passes directly from the feed conveyor 23 onto the in-feed conveyor 27 without rotational reorientation by the article rotator 24. As shown, its outer face F remains oriented in the vertical plane defined by the side wall 26 of the feed conveyor 23. The next article $A_2$ is also shown moving through the article rotator 24 without rotational reorientation for transfer onto the first in-feed conveyor 27 in spaced relation to the preceding article $A_1$.

Figure 3:
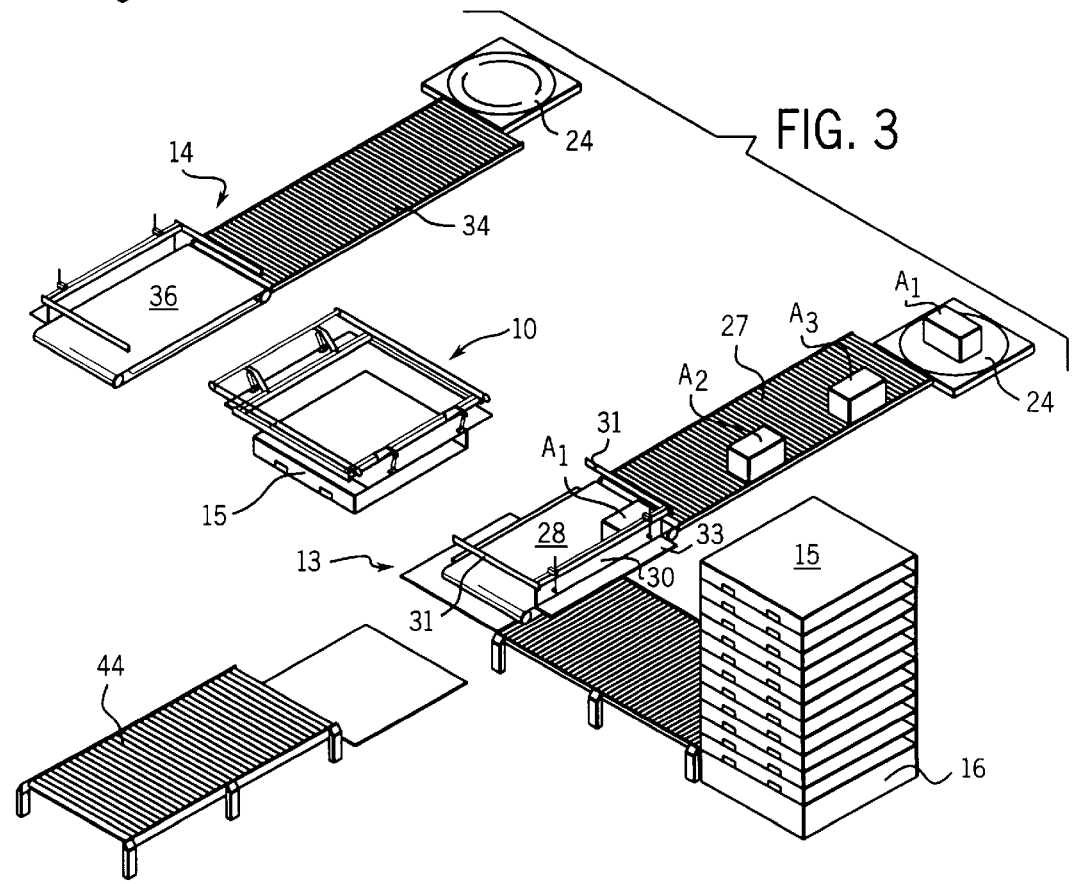

In FIG. 3, the lead article $A_1$ is shown immediately after transfer from the downstream end of the first in-feed conveyor 27 onto the upstream end of a tier station conveyor 28. The tier station conveyor 28 is a belt conveyor which is synchronized to be driven intermittently each time an article A reaches its upstream end. As shown, the first tier station conveyor 28 is operated just long enough to clear article $A_1$ from the in-feed conveyor 27 so that the article is stopped immediately after clearing the downstream end of the in-feed conveyor.

A laterally movable pusher plate 30 is positioned above the tier station conveyor 28 and, in its fully retracted position shown in FIG. 3, has a vertical plate surface positioned in the plane common to the lateral face F of article $A_1$. The ends of the pusher plate 30 are supported on carriage tracks 31 operable to drive the pusher plate laterally across the station conveyor 28 from its FIG. 3 position, as will be described hereinafter. In FIG. 3, the immediately following articles $A_2$ and $A_3$ are shown moving along the first in-feed conveyor 27. When article $A_2$ reaches the downstream end of the in-feed conveyor 27 to a position where it is in end-to-end abutment with article $A_1$, the tier station conveyor 28 is operated to carry articles $A_1$ and $A_2$ until the trailing article $A_2$ has cleared the in-feed conveyor 27. In the meantime, the in-feed conveyor 27 continues to operate and to carry article $A_3$ toward the first tier station conveyor 28.

Figure 4:
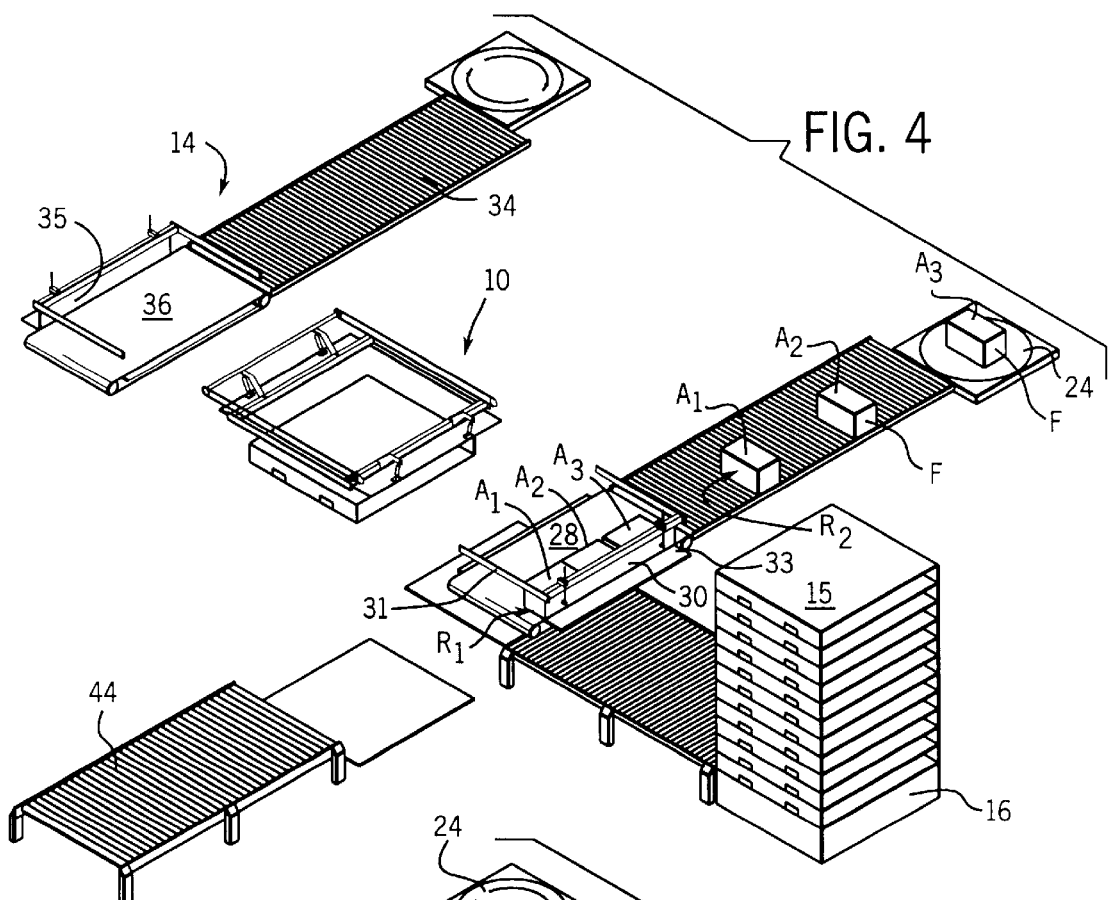

In FIG. 4, article $A_3$ is shown after it has been transferred onto the tier station conveyor 28 and, with preceding articles $A_1$ and $A_2$ forms a first row $R_1$ of articles. The outside faces F of each of the articles $A_1$–$A_3$ remain in the common vertical plane originally established by the side wall 26 of the initial feed conveyor 23, which is also coplanar with the face of the pusher plate 30. It will be noted in FIG. 4 that row $R_1$ includes a gap between articles $A_2$ and $A_3$. The gap is created to match the length of the row $R_1$ more closely to the length of the pallet 15 on which the row will eventually be deposited. The length of the gap or even the presence of a gap in a row at all depends on the length of the articles or the width of the articles (if they are reoriented) as will be described in greater detail hereinafter. Actual creation of the gap may be accomplished at the time article $A_2$ is transferred from the in-feed conveyor 27 to the tier station conveyor 28 or may be accomplished by activating the tier station 28 shortly before article $A_3$ reaches its upstream end.

With continued reference to FIG. 4, the articles $A_1$–$A_3$ forming part of the next row $R_2$ have been delivered from the supply conveyor system 21 and are moving toward the tier station conveyor 28. However, each of these articles A has been turned 90° on the article rotator 24 while the outside face F of each is maintained in the same common vertical plane as the faces F of the articles in the preceding row $R_1$ already formed. In this regard and referring again to FIG. 18, the article rotator 24 is constructed to rotate the articles A about a vertical axis 32 which is positioned to place the rotated face F of the article in the same vertical plane as the face of the article in contact with the side wall 26 prior to 90° rotation. The rotator 24 preferably includes means to clamp the article vertically during rotation to insure proper face alignment is maintained.

Figure 5:
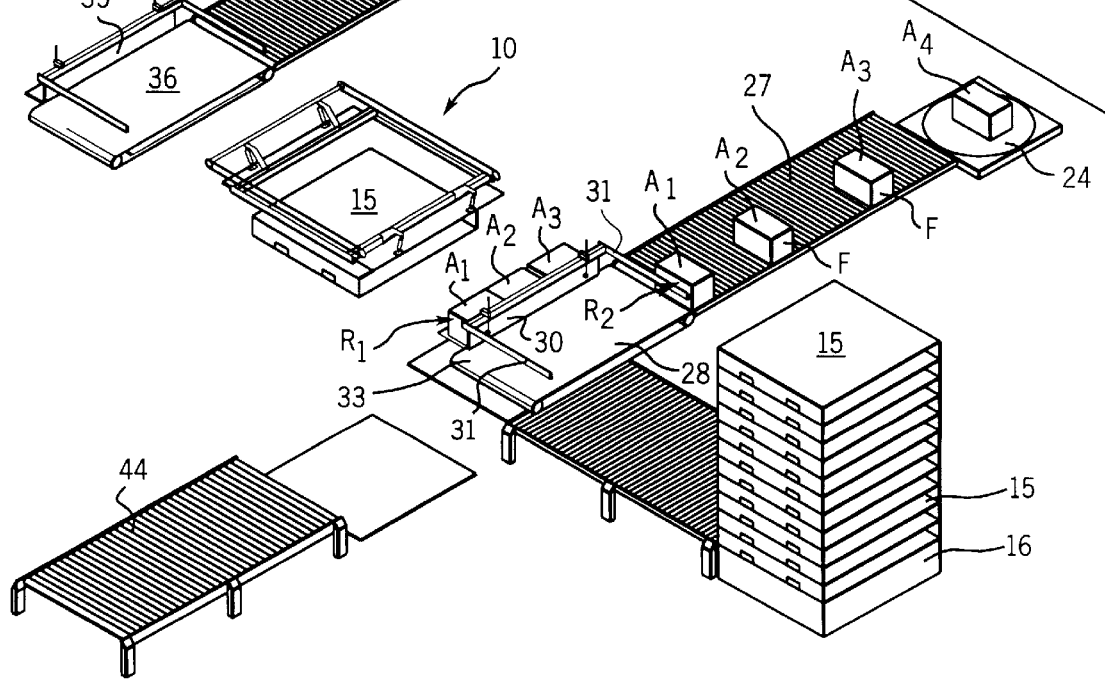

Before the lead article $A_1$ of the next row $R_2$ reaches the end of the in-feed conveyor 27, the pusher plate 30 is activated to move along its supporting carriage tracks 31 to push row $R_1$ laterally across the stationary surface of the first tier station conveyor 28 and onto the leading edge of a transfer sheet 33 which has simultaneously been extended outward from beneath the upper run of the tier station conveyor, as shown in FIG. 5. As soon as row $R_1$ is deposited on the transfer sheet 33, the pusher plate 30 is immediately raised vertically, withdrawn horizontally and lowered to its original position in the common vertical plane of the lateral faces F of the articles forming the next row $R_2$. Vertical raising and lowering of the pusher plate 30 is effected by air cylinders 29 or other suitable linear actuators.

Figure 6:
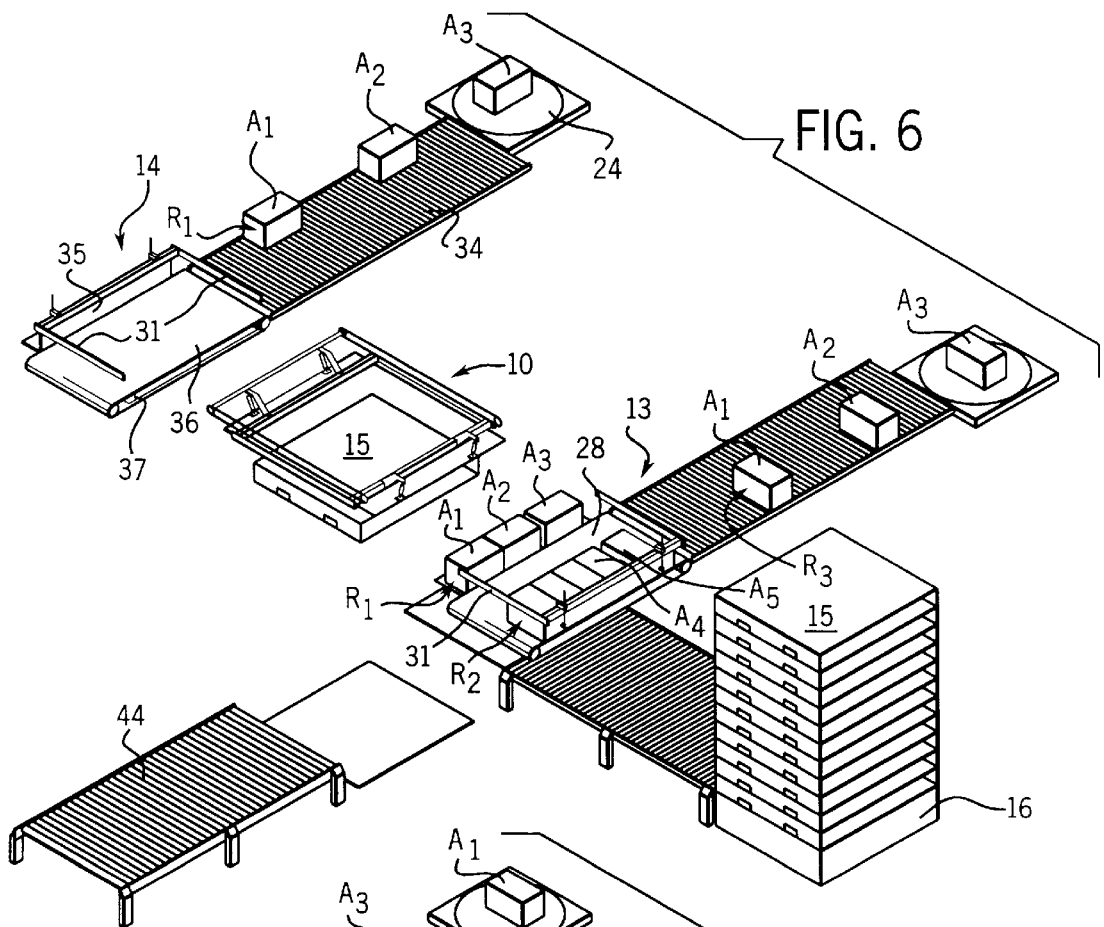

As shown in FIG. 6, row $R_2$ is formed on the first tier station conveyor 28 in generally the same manner as the preceding row $R_1$, but is comprised of five articles $A_1$–$A_5$ because the row $R_2$ is formed of articles which have been reoriented to align their narrow dimension by 90° rotation on the upstream article rotator 24. Row $R_2$ is also formed with a gap between the last two articles $A_4$ and $A_5$, but the gap is slightly smaller and offset in the upstream direction with respect to the direction of row formation from the gap formed in row $R_1$.

Figure 7:
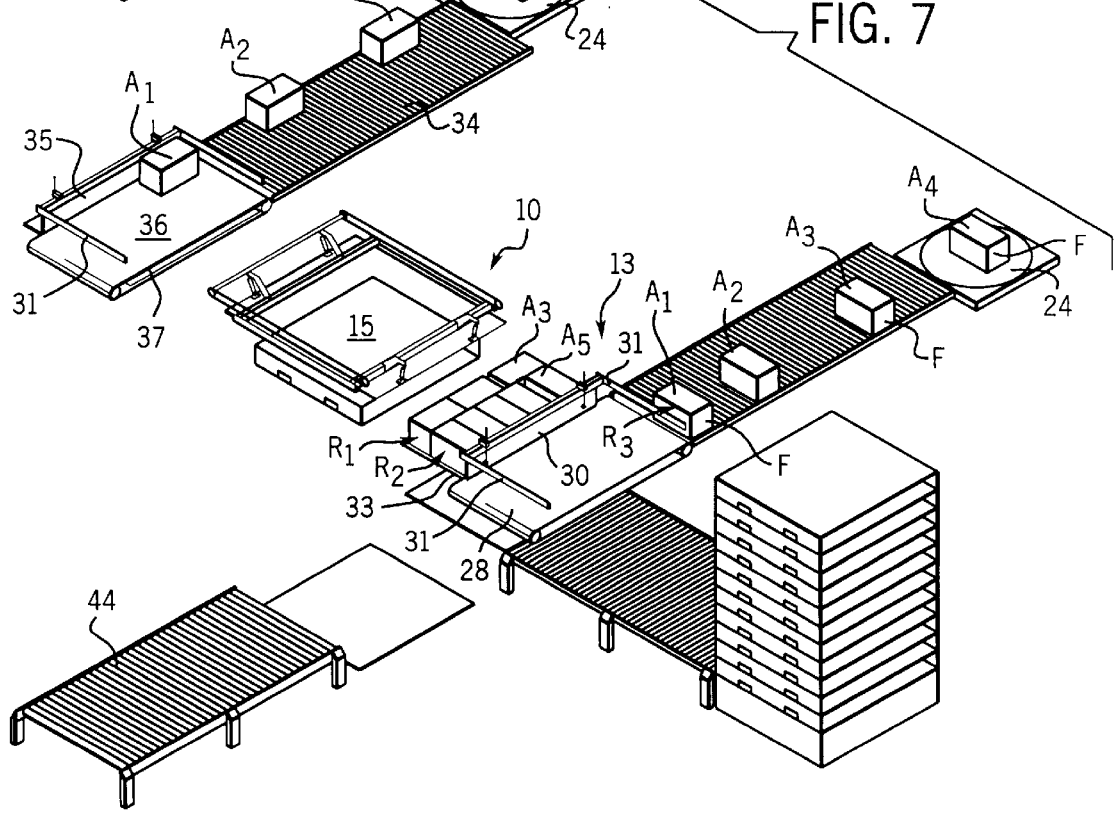

As row $R_2$ is being formed in the first tier forming station 13, a first row $R_1$ is also being formed in the second tier forming station 14 on the opposite side of the stacking station 10. The articles $A_1$–$A_3$ destined to form row $R_1$ in the second tier forming station 14 travel from the feed conveyor 23 onto a second in-feed conveyor 34 in exactly the same manner previously described for row $R_1$ in the first tier forming station 13. Thus, the articles $A_1$–$A_3$ travel along the second in-feed conveyor 34 with their lateral outer faces (not visible in FIG. 6) in a common vertical plane which is coplanar with the face of the second pusher plate 35 located above the second tier station conveyor 36. Also, the formation of a third row $R_3$ is progressing along the first in-feed conveyor 27 and, referring also to FIG. 7, before the first article $A_1$ of new row $R_3$ reaches the downstream end of in-feed conveyor 27, preceding row $R_2$ is moved laterally across tier station conveyor 28 and onto the transfer sheet 33 which has also been indexed toward the stacking station 10 by a distance sufficient to accommodate the width of row $R_2$. After transfer of row $R_2$, the pusher plate 30 is immediately raised, retracted and lowered to its initial position in the vertical plane of the faces F of the articles which will form row $R_3$.

Figure 8:
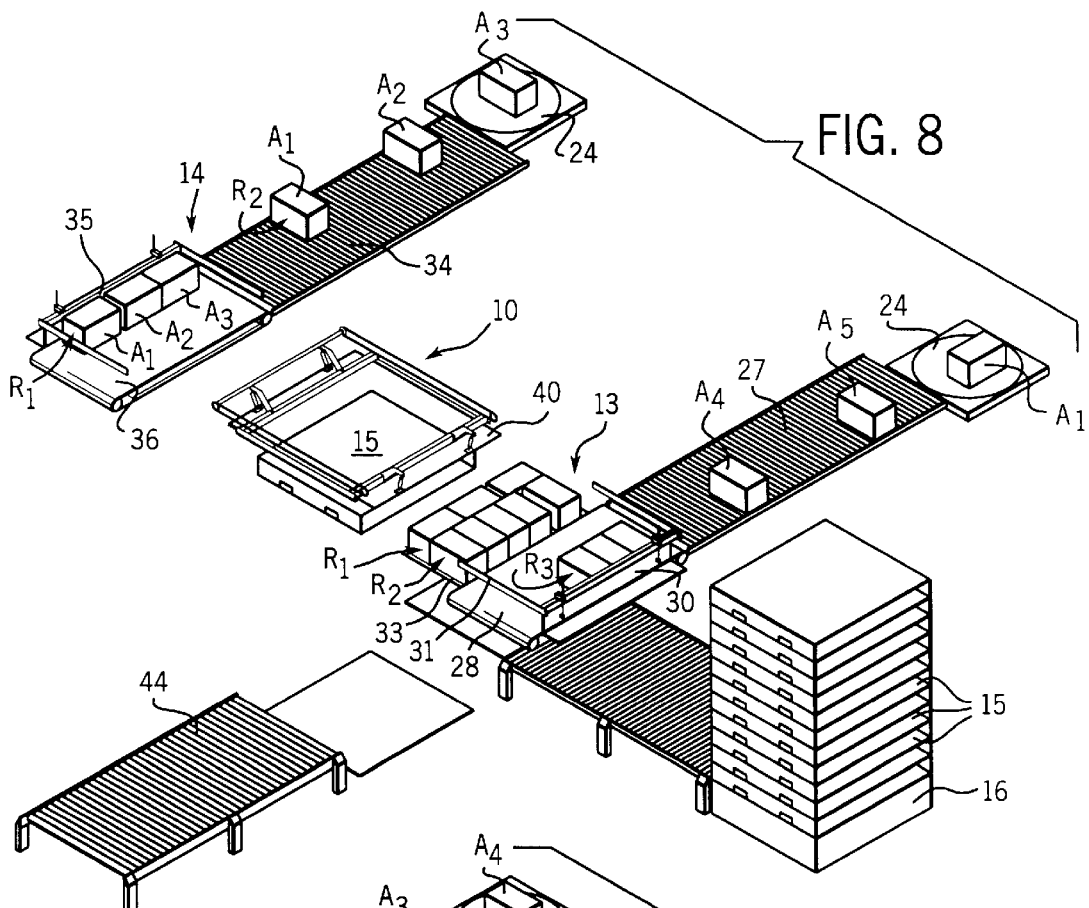
Figure 9:
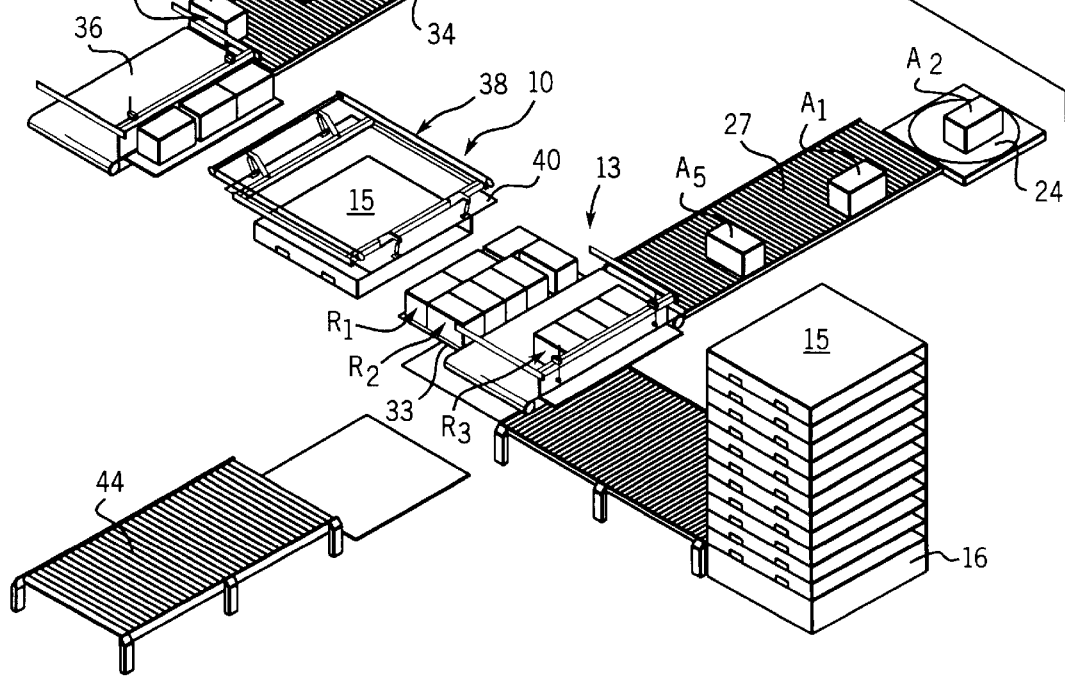

In FIG. 8, row $R_1$ comprising articles $A_1$–$A_3$ has been completed in the second tier forming station 14, while row $R_3$ is being completed in the first tier forming station 13 in a form identical to preceding row $R_2$. It will be noted that row $R_1$ formed on the second tier station conveyor 36 is slightly different than the corresponding row $R_1$ formed on the first tier station conveyor 28. The difference is that the gap is formed between the first two articles $A_1$ and $A_2$, rather than between the second and third articles as in row $R_1$ in the first tier forming station 13. As soon as row $R_1$ is completed on the second tier station conveyor 36, pusher plate 35 is activated to transfer the row across the conveyor and onto the second transfer sheet 37 which has been indexed outwardly from under the conveyor 36, simultaneously with movement of the pusher plate 35, a distance sufficient to accommodate row $R_1$. The transfer of row $R_1$ is shown in FIG. 9. Immediately after deposit of the row onto the transfer sheet 37, the pusher plate 35 is raised, retracted and lowered to its initial row forming position. FIG. 9 also shows the last article $A_5$ moving along the first in-feed conveyor 27 to complete row $R_3$. Meanwhile, the movement of the lead articles $A_1$–$A_3$ for row $R_2$ continues on the opposite second in-feed conveyor 34.

Figure 10:
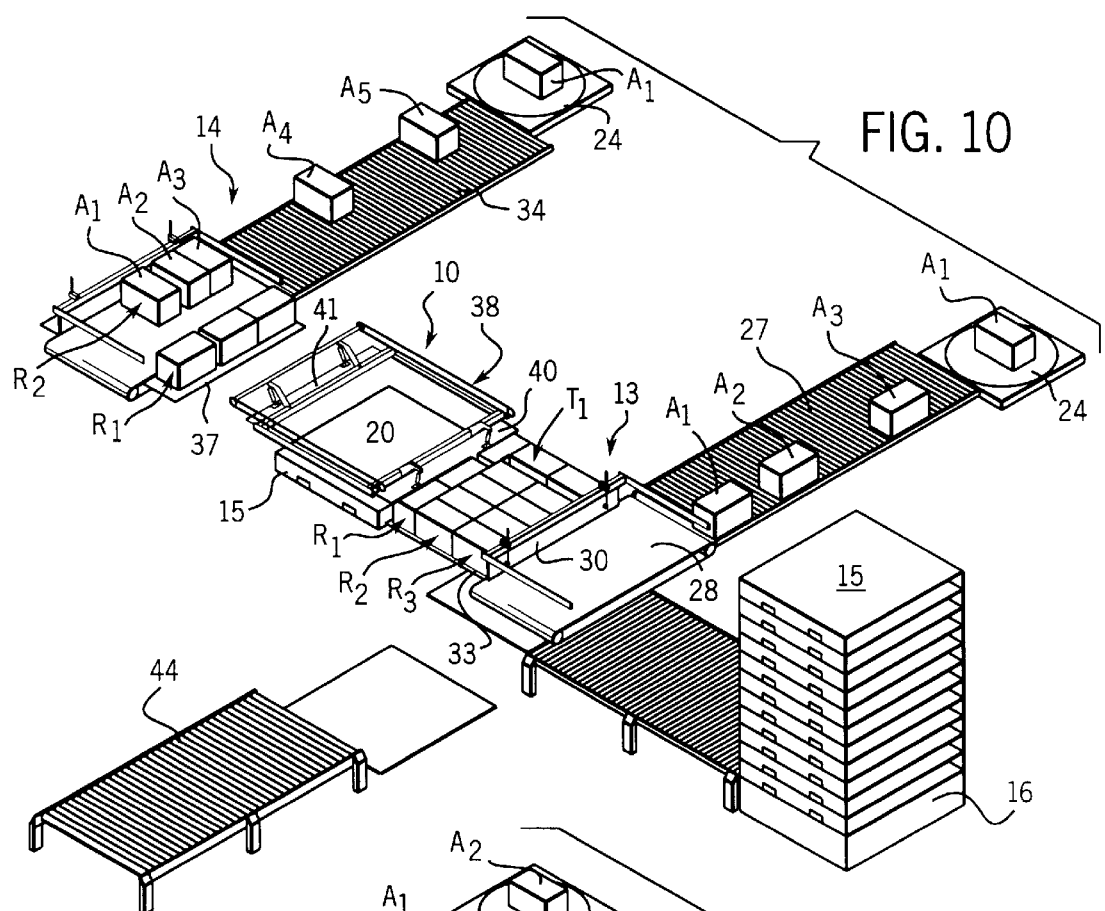
Figure 11:
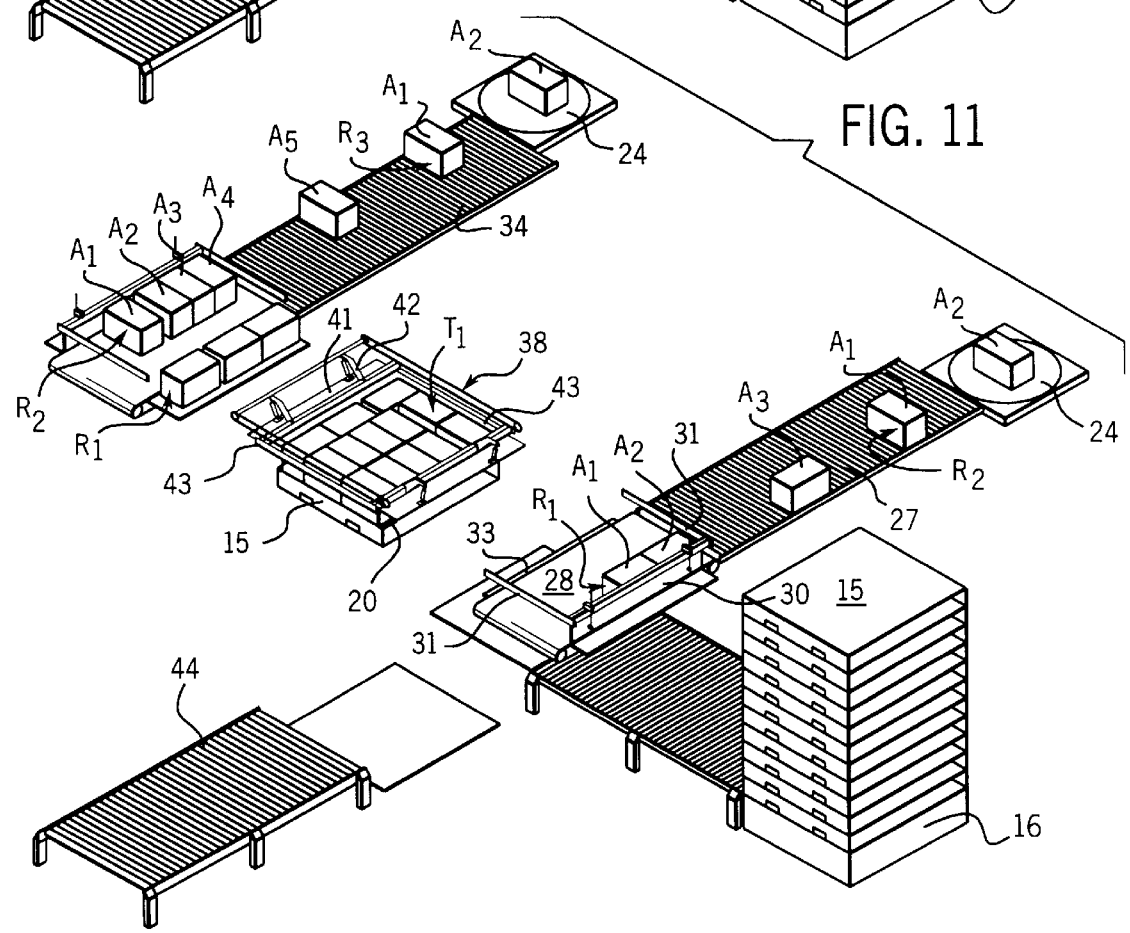
Figure 12:
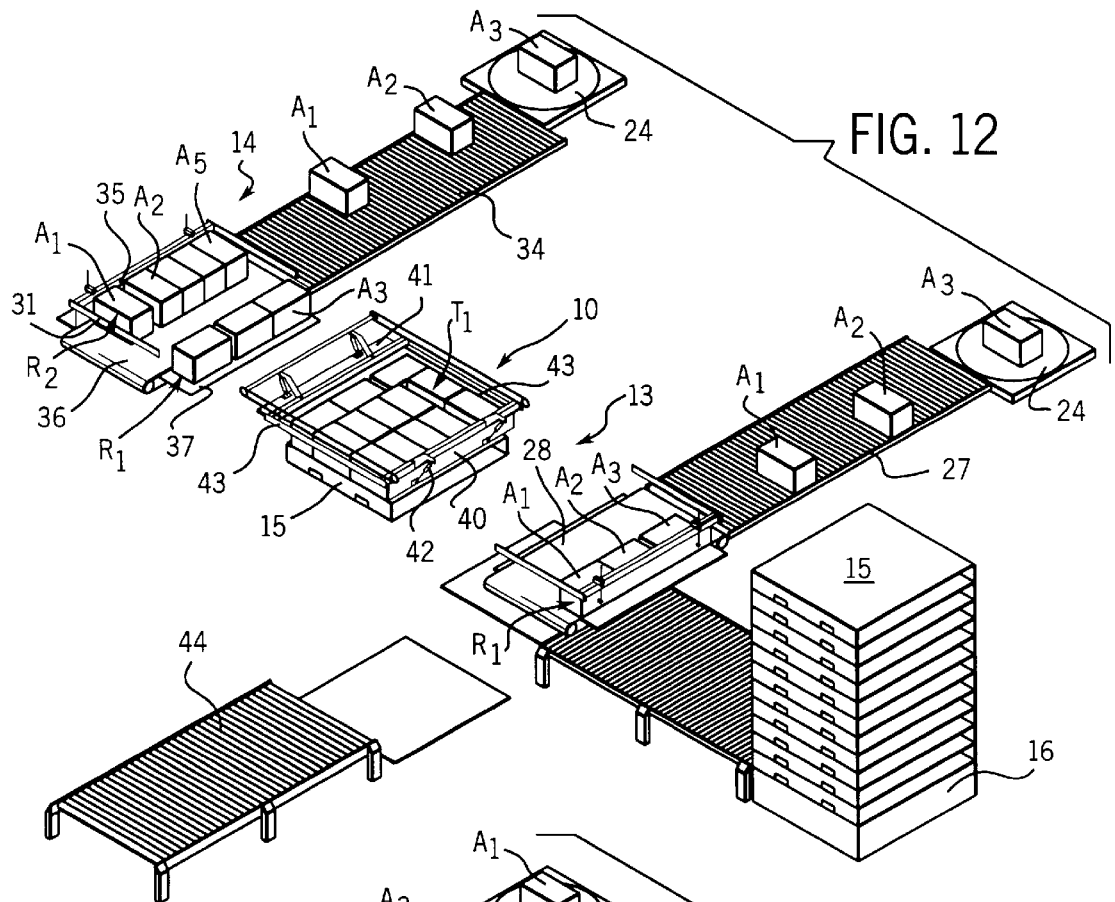

Referring once again to the first tier forming station 13 and continuing on to FIG. 10, the transfer sheet 33 has been again indexed laterally by a distance equal to the width of row $R_3$, which row has been transferred by pusher plate 30 onto the transfer sheet and into side-to-side abutment with row $R_2$. The three rows $R_1$–$R_3$ form tier $T_1$ on the transfer sheet 33. Transfer sheet 33, carrying the completed tier $T_1$ is then moved laterally into the stacking station 10 over the top of the pallet 15 positioned therein. The top of the pallet and any tie sheet 20 placed thereon are positioned vertically so that the transfer sheet 33 just clears the upper surface. A tier scraper and squaring mechanism 38 is positioned directly above the stacking station 10 and includes first and second scraper plates 40 and 41, each of which is mounted to pivot about a horizontal axis between an upper horizontal inoperative position (shown in FIGS. 10 and 11) and a lower vertical operative position shown in FIG. 12. Each of the scraper plates 40 and 41 may conveniently be rotated between the upper horizontal inoperative position, allowing the transfer sheet 33 and tier $T_1$ to be moved from the FIG. 10 position, under the first scraper plate 40, and into the FIG. 11 position over the pallet 15 in the stacking station. With the tier $T_1$ supported in the stacking station on the transfer sheet 33, fluid cylinders 42 operatively attached to the scraper plates 40 and 41 are extended to cause the plates to pivot downwardly to their vertical operative positions and into engagement with the respective opposite end faces of the tier $T_1$ of articles, as shown in FIG. 12. A pair of side tamps 43 are suspended from the scraper and squaring mechanism 38, one adjacent each side face of the tier $T_1$. The side tamps are operable similarly to the scraper plates 40 and 41 so that they may be rotated downwardly into a vertically disposed operative position (shown in FIGS. 11 and 12) into engagement with the side faces of the tier $T_1$. Thus, the combined operative positioning of the scraper plate pair 40 and 41 and the side tamp pair 43 effects a squaring of the tier on the transfer sheet 33. The transfer sheet is then withdrawn fully from beneath the tier of articles, returned to its position below the first tier station conveyor 28, while the face of the first scraper plate 40 engages the end face of the tier formed by the articles in row $R_3$ thereby permitting the entire tier $T_1$ to be held against horizontal movement. The tier is thus deposited directly on the pallet 15 (or tie sheet 20, if present).

Figure 16:
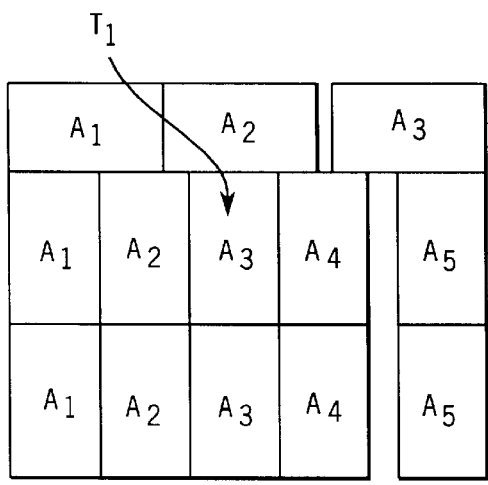
FIGS. 16 and 17 are top plan views of vertically adjacent superimposed stacked tiers of articles showing alternate stacking arrangements.
Figure 17:
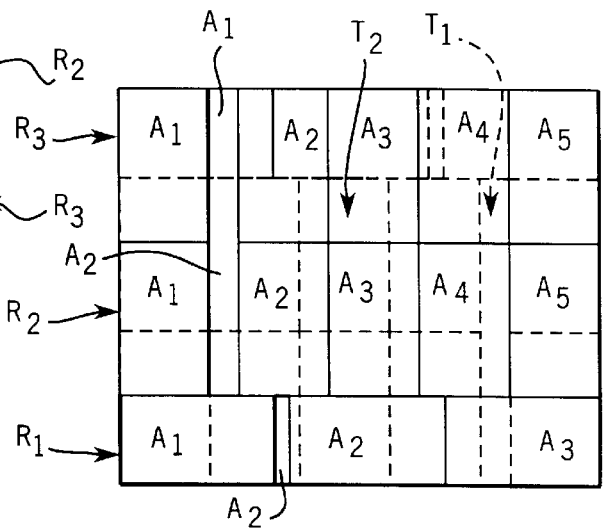

While tier $T_1$ from the first tier forming station is being deposited in the stacking station, row $R_2$ has been formed on the tier station conveyor 36 in the second tier forming station 14, as shown in FIG. 12. Row $R_2$ is then transferred laterally onto the outwardly indexed second transfer sheet 37 by lateral movement of the second pusher plate 35. In the meantime, the articles which will form row $R_3$ and complete the formation of tier $T_2$ in the second tier forming station 14 are moving through the supply conveyor system 21 and onto the second in-feed conveyor 34. Rows $R_2$ and $R_3$ are identical to one another, but each is formed of articles which have been reoriented by 90° rotation with respect to the articles forming row $R_1$. Thus, rows $R_2$ and $R_3$ for tier $T_2$ are nearly identical to the corresponding rows formed for the first tier $T_1$ except, as may be seen in FIGS. 12 and 13, rows $R_2$ and $R_3$ in tier $T_2$ are formed with the gaps between the first two articles $A_1$ and $A_2$, rather than the last two, as in tier $T_1$. As previously described, row $R_1$ of tier $T_2$ was also formed with the gap at the opposite end as compared to the corresponding row from tier $T_1$. Comparing tiers $T_1$ and $T_2$ in top plan view, as seen for example in FIG. 13, it will be seen that the tiers are identical except for relative rotation 180° with respect to one another about a vertical axis. As a result, and as shown in FIGS. 16 and 17, there is no overlap in any gaps in tier $T_1$ with the gaps in tier $T_2$ when the latter is deposited atop the former in the stacking station. Each of the tiers is horizontally asymmetric, in both the lateral and longitudinal direction, because of the particular size and shape of the articles A. However, palletizing articles of a different size and/or shape could result in tiers of unidirectional asymmetry or even complete symmetry.

On the other side of the system in FIG. 12, in the first tier forming station 13, the first row $R_1$ of tier $T_3$ has been formed and is ready for lateral transfer onto the first transfer sheet 33 in the same manner previously described for the first row of tier $T_1$.

Figure 13:
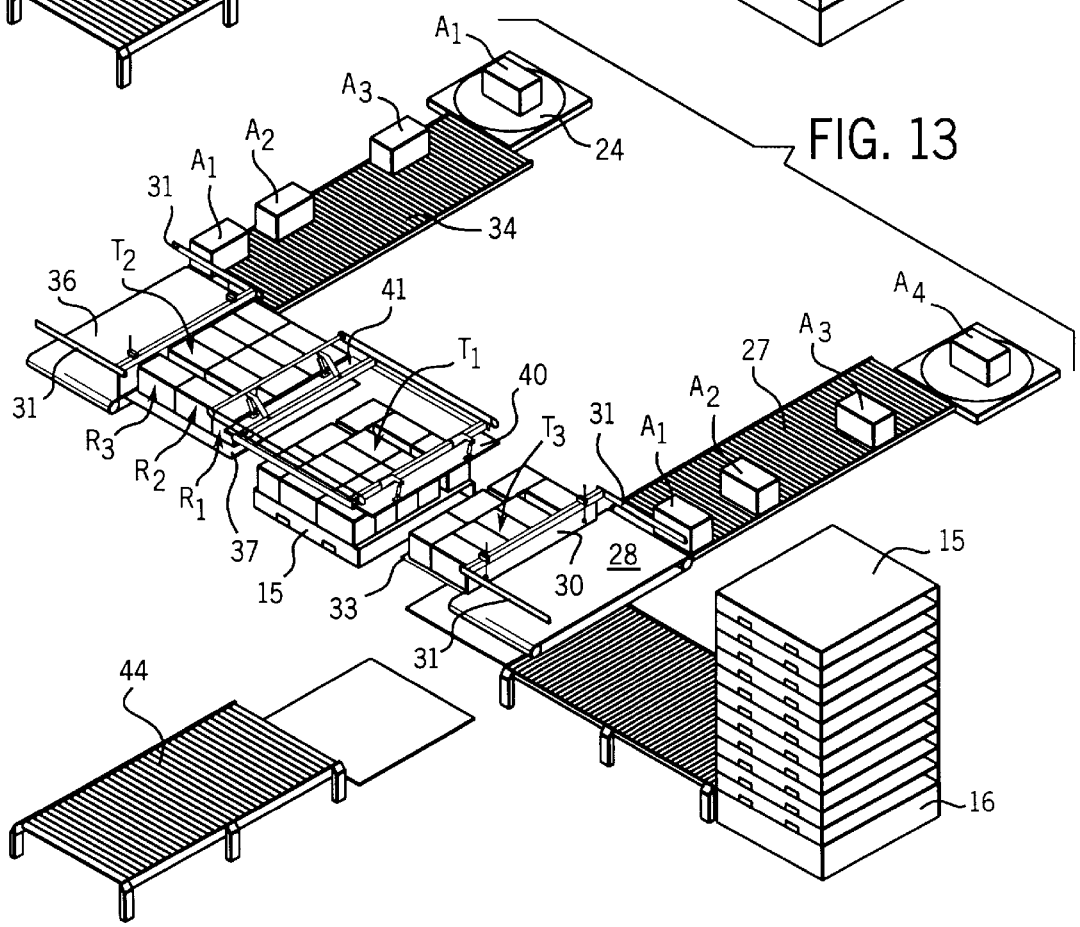
Figure 14:
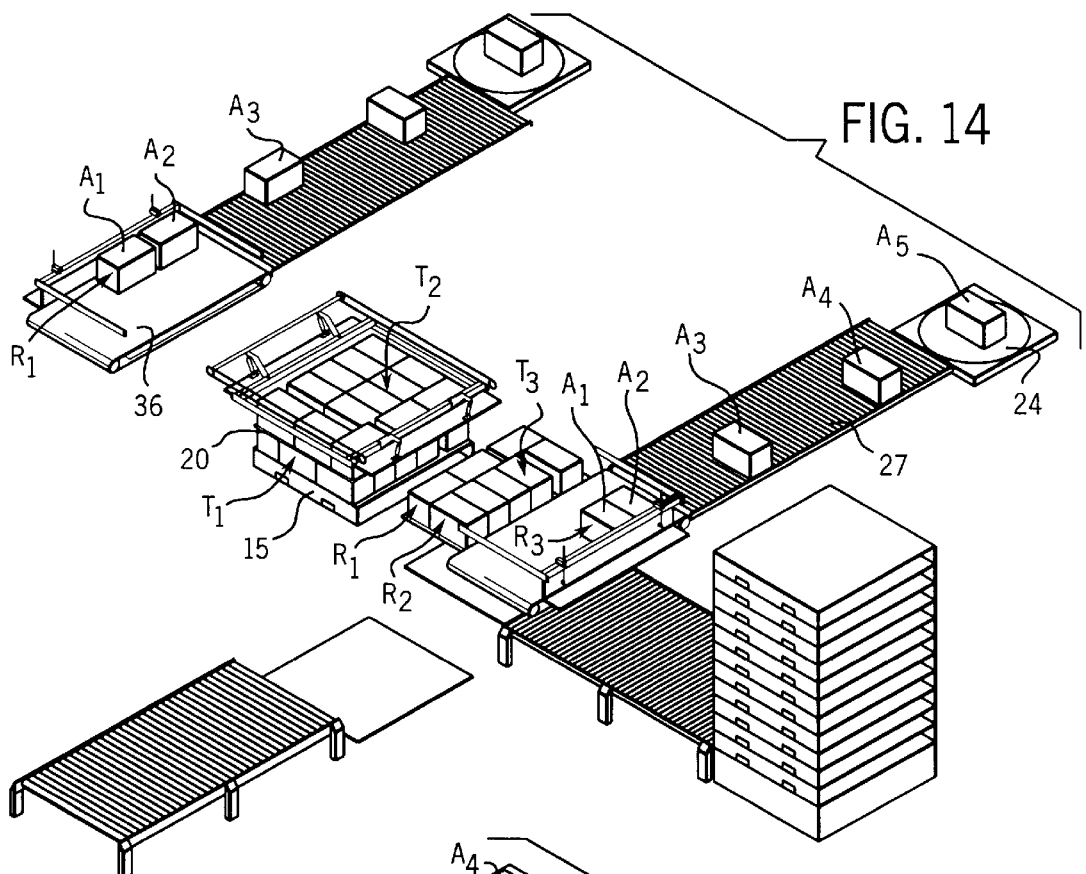

Referring also to FIG. 14, tier $T_2$ formed on the second transfer sheet 37 (as best shown in FIG. 13) is transferred into the stacking station on the transfer sheet in the same manner previously described with respect to tier $T_1$ and transfer sheet 33. However, prior to actual transfer into the stacking station, the pallet supporting platform 11 (FIG. 1) is indexed downwardly a distance equal to the height of the transfer sheet and one tier. Also, the tie sheet feeder 17 (FIG. 1) may be operated to place a tie sheet 20 on top of tier $T_1$ to provide a separation between it and tier $T_2$ as is common in the prior art. It should also be pointed out that the gaps formed between articles in each of the rows results in tiers which have areas that correspond generally to the area of the pallet 15 and are shaped so that their perimeters substantially correspond to the pallet perimeter. The result is an overall rectangular prismatic shape to the entire palletized load which enhances load wrapping or banding, as well as transfer, shipping and storage.

Figure 15:
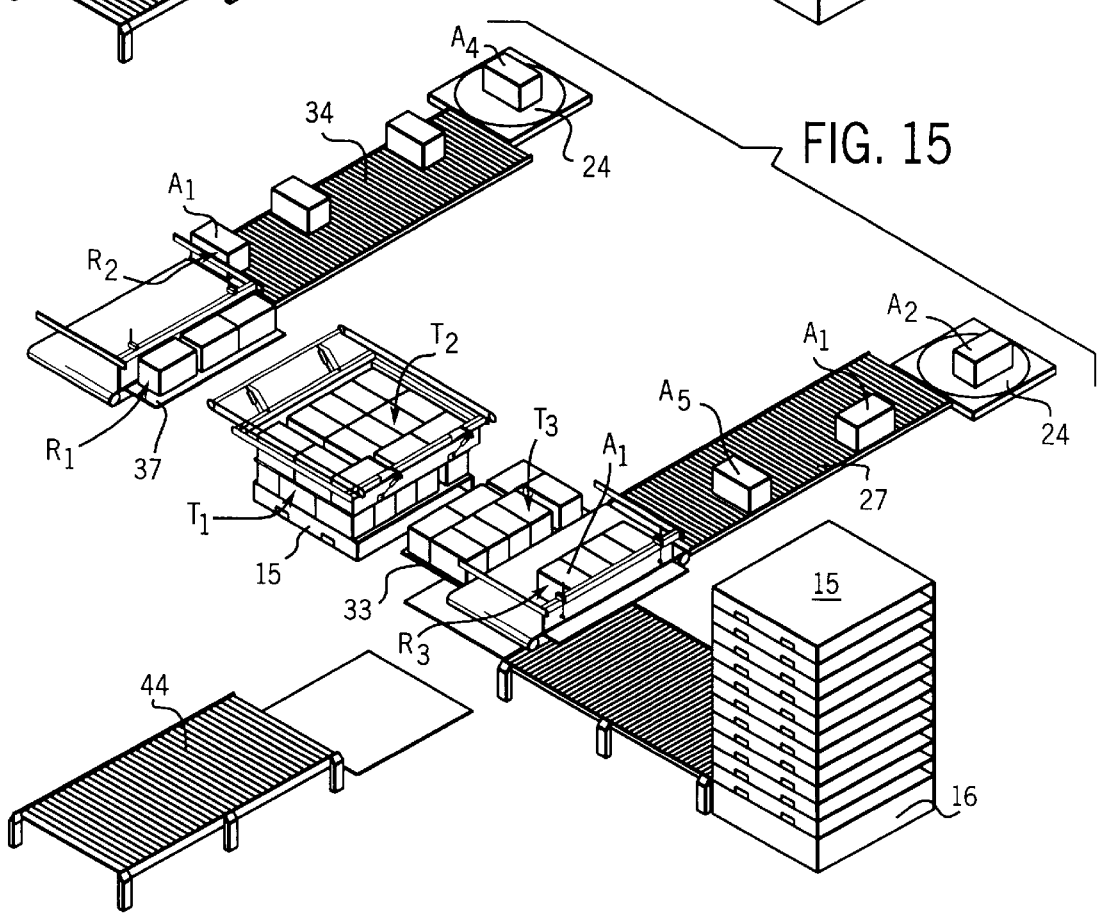

If the palletized load is to comprise three tiers, the third tier $T_3$ which is in the process of being formed in the first tier forming station 13 by the addition of the final row $R_3$ (FIG. 15), is transferred into the stacking station 10 and deposited atop the tie sheet 20 and tier $T_2$ in the same manner previously described. Subsequent tiers in both tier forming stations 13 and 14 may be continued to be formed as described, whether intended for the stack $S_1$ presently being formed in the stacking station or a subsequently formed new stack. Referring again to FIG. 1, the completed stack which has been incrementally lowered by the pallet supporting platform 11 during formation, is finally lowered to position the supporting pallet 15 in the same horizontal plane as a stack discharge conveyor 44 which is operative to carry the palletized stack from the system. Another pallet 15 for the subsequent stack is supplied from the pallet feeder 16 to the pallet supporting platform 11 in the stacking station and raised vertically to a level for receipt of the first new tier $T_1$, with a tie sheet being placed thereon as desired.

The system of the present invention provides a significant increase in the overall palletizing speed because it is not necessary to halt or delay row, tier or stack formation to await the return of reciprocating transfer mechanisms. Another advantage of continuous formation of tiers from two opposite sides of the stacking station is that the control program can utilize nearly identical routines to form alternate mirror image tiers in the tier forming stations 13 and 14. As indicated previously, the tiers $T_1$ and $T_2$, whose formation has been described with respect to the described embodiment, are not true mirror images of one another, but are rather formed identically but relatively rotated 180° about a vertical axis. In the particular arrangement of articles A used to form these tiers, better stack stability is attained by utilizing a modified mirror image tier formation as previously described and shown in FIG. 16. Referring to FIG. 17, a true mirror image formation of vertically adjacent tiers would result in an overlap in gaps between adjacent tiers and the possibility of a substantial lack of support for certain articles in the upper tier. This formation of overlapping gaps would become aggravated if subsequent tiers were similarly formed, resulting in potential instability of the entire stack and stack imbalance as well. Of course, article size and shape may vary considerably from one order to another, but the system is widely adaptable to program the row, tier and stack formation subroutines in a manner which accommodates the formation of tiers which conform to the pallets and provide gaps within the tiers which are distributed to avoid or minimize instability.

Figure 19A:
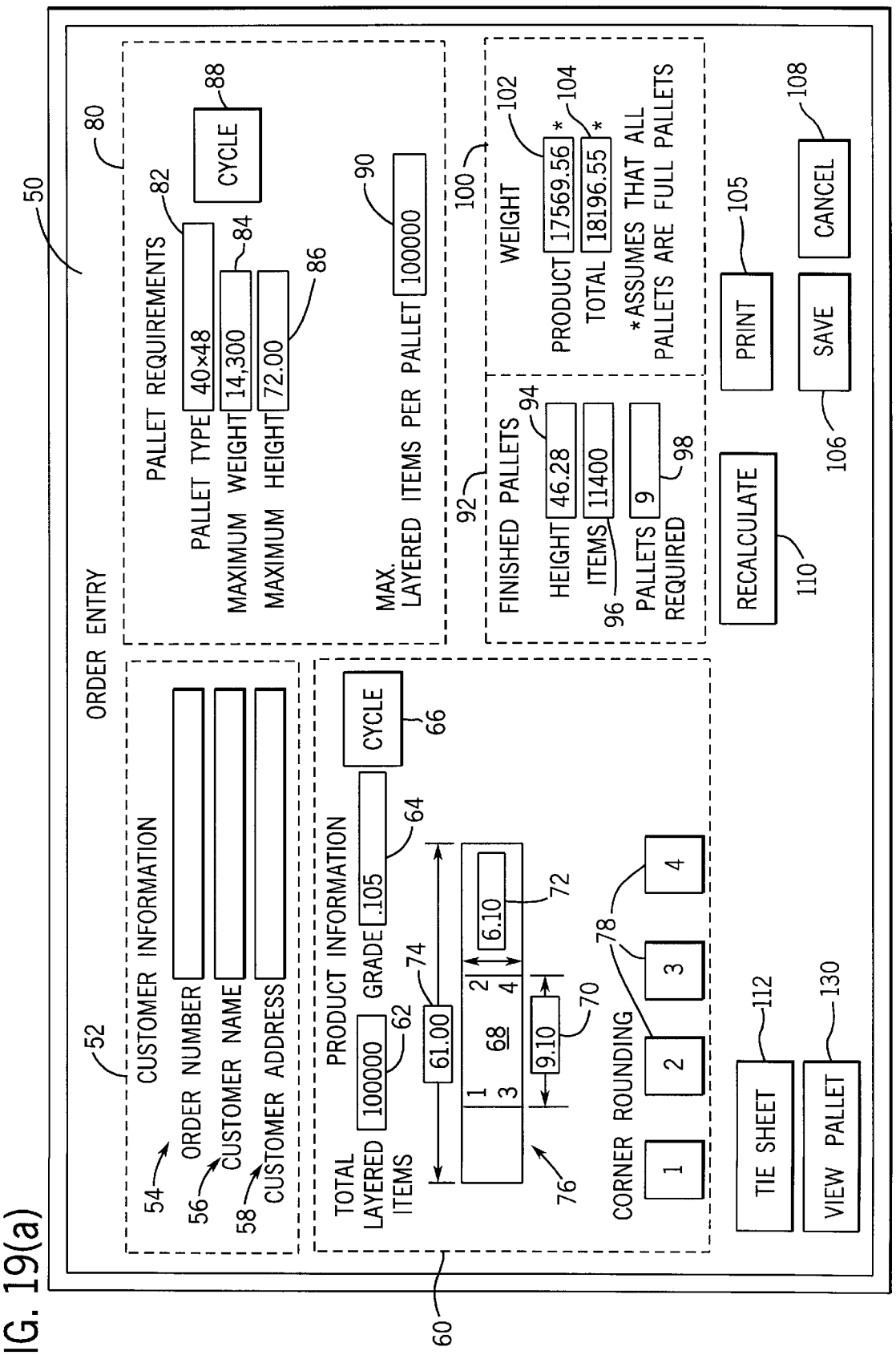
FIGS. 19(a)–(f) are operator interface output screens of a computer monitor in accordance with the present invention.

FIG. 19(a) shows a main order entry screen 50 which in the preferred embodiment is a touch sensitive computer monitor 4, FIG. 1. The main order entry screen 50, FIG. 19(a), has customer information input parameters 52, including such items as an order number 54, a customer name 56, and a customer address 58. Main order entry screen 50 also includes a product information section 60 having inputs that include a total number of layered items to be produced 62 and the grade of the articles 64. The grade parameter 64 includes three subparts: a character string for identifying the grade, a caliper or thickness of the particular item, and the density of the item. A touch sensitive grade cycle switch 66 allows a user to cycle through the previously inputted grade character strings to easily and quickly choose grades that are commonly used that are stored in the memory of computer 2.

In terms of the preferred embodiment, the layered items are typically sheets of paperboard that are stacked in bundles. A bundle of the layered items has a rectangular shape similar to that of a box or container that could also be combined in a manner according to the present invention. To maintain consistent terminology, a sheet of paperboard, or similar material, will be referred to as a layered item, or simply an item. The bundles of paperboard, box, or container, will be referred to as articles, which have the same base dimensions of a layered item.

The product information section 60 also includes a visual representation of an item 68 with inputs for the item base width 70 and the item base length 72. In the preferred embodiment, in which the layered item is a sheet of paperboard cut from a strip of paperboard, a strip width 74 is provided along with a visual representation of the strip 76. Item 68 is also identified by its corners numbered 1, 2, 3 and 4. By touching one of the touch sensitive corner rounding switches 78, one or more of the respective corners of the items 68 can be trimmed or rounded, as is common with cardboard inserts.

Main order entry screen 50 also includes a pallet requirements section 80 having inputs to select a pallet type 82, pallet maximum weight 84, and pallet maximum height 86. A touch sensitive pallet type cycle switch 88 is provided to cycle through standard pallet types and allow a user to select a pallet type from a listing of standard pallet types stored in the memory of computer 2, FIG. 1. The pallet requirement section 80 also includes a maximum items per pallet input 90 for defining the maximum number of items that can be stacked on a single pallet.

Main order entry screen 50 includes finished pallets section 92 displaying the calculated height 94 of a finished pallet, and a calculated number of items 96 per pallet, and a calculated number of pallets required to fill the order of articles 62.

A weight section 100 supplies a calculated product weight 102 for an entire order, and a total weight 104 which includes the product weight 102 and the combined weight of all the pallets required 98.

The main order entry screen 50 includes touch sensitive switches for printing the main order entry screen 105, saving the order to an internal memory or an external disk drive 106, canceling the current order 108, and recalculating an order 110.

Figure 19C:
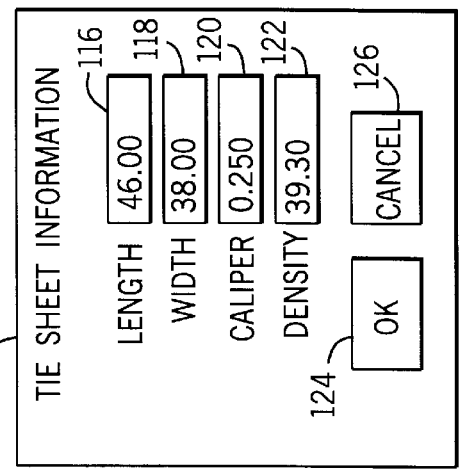

Main order entry screen 50 also has a touch sensitive tie sheet switch 112, which when activated produces a tie sheet information entry screen 114 of FIG. 19(c). The user is then allowed to enter a length 116, a width 118, a caliper 120, and a density 122 of a tie sheet, if one is desired. Additional touch sensitive switches are provided to approve the tie sheet information 124, or cancel same 126.

Figure 19B:
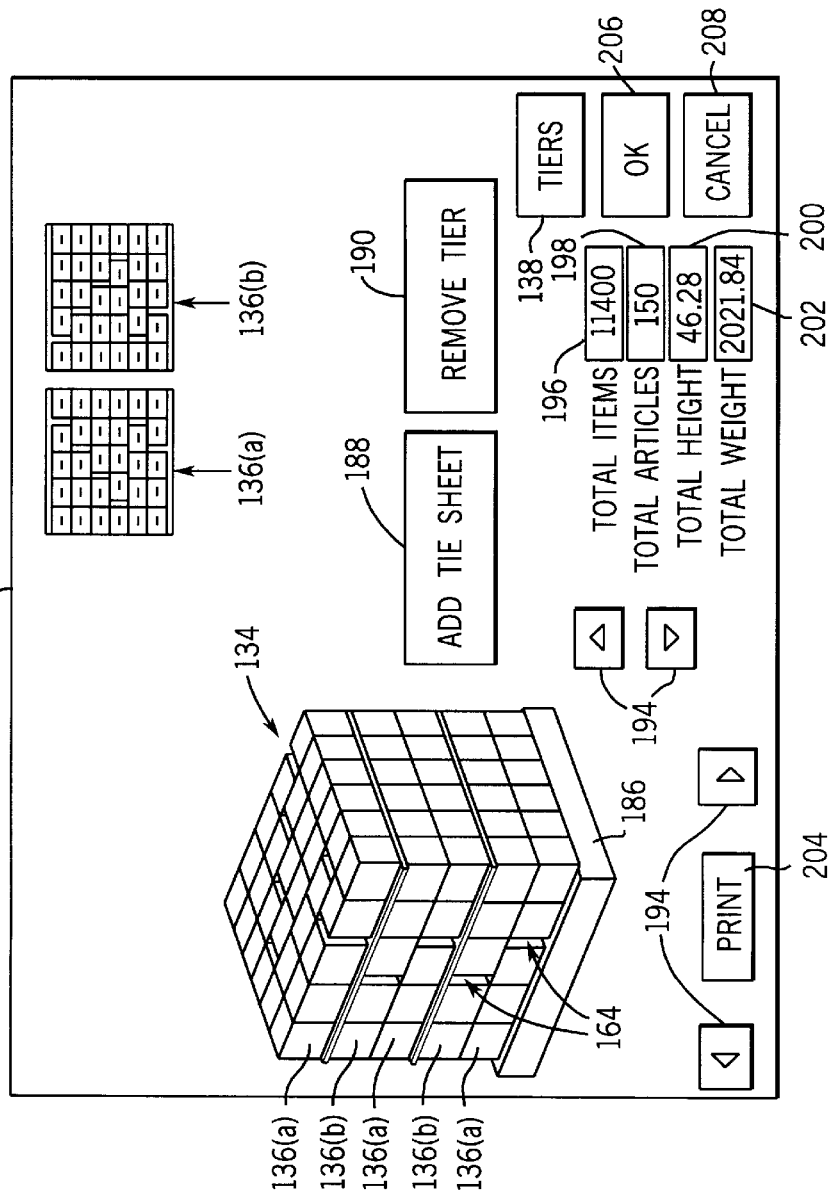

Main order entry screen 50 includes a touch sensitive view pallet switch 130, which when activated produces a view pallet screen 132 of FIG. 19(b). View pallet screen 132 includes a visual representation of a unit configuration 134, and a visual representations of the tier configurations 136(a), 136(b) used in constructing unit configuration 134. In order to generate the tier configurations, a touch sensitive tiers switch 138 is provided in the view pallet screen 132, and when activated, produces a tiers-in-use screen 140, FIG. 19(d), which also displays the visual representations of the tier configurations 136.

Figure 19D:
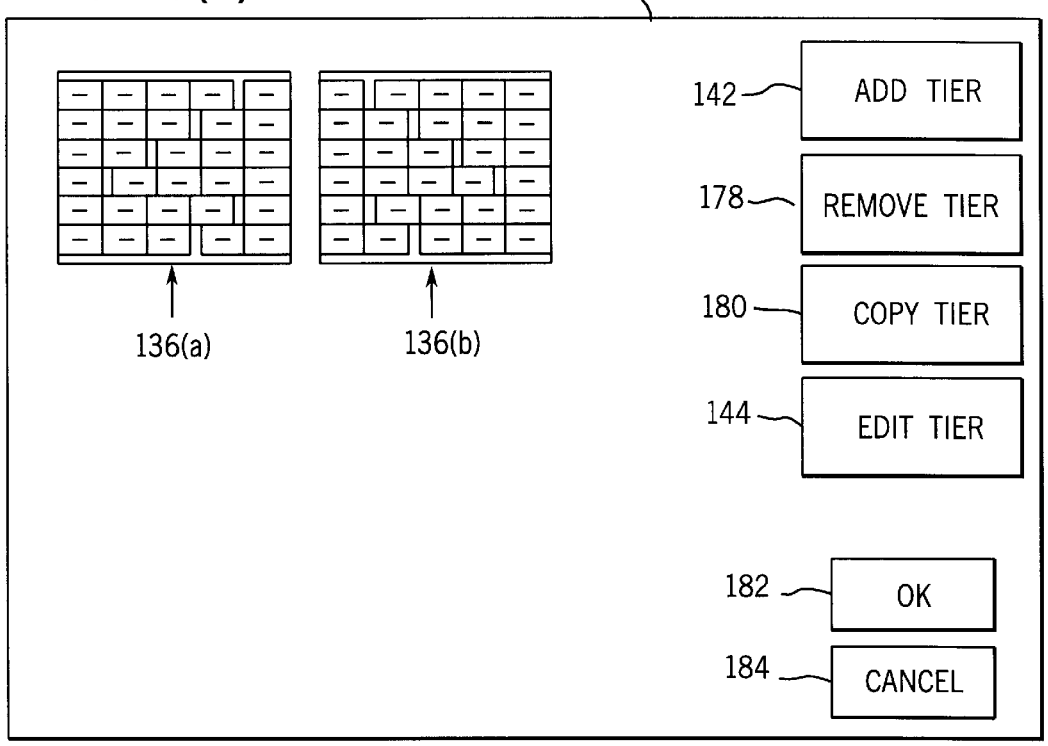
Figure 19E:
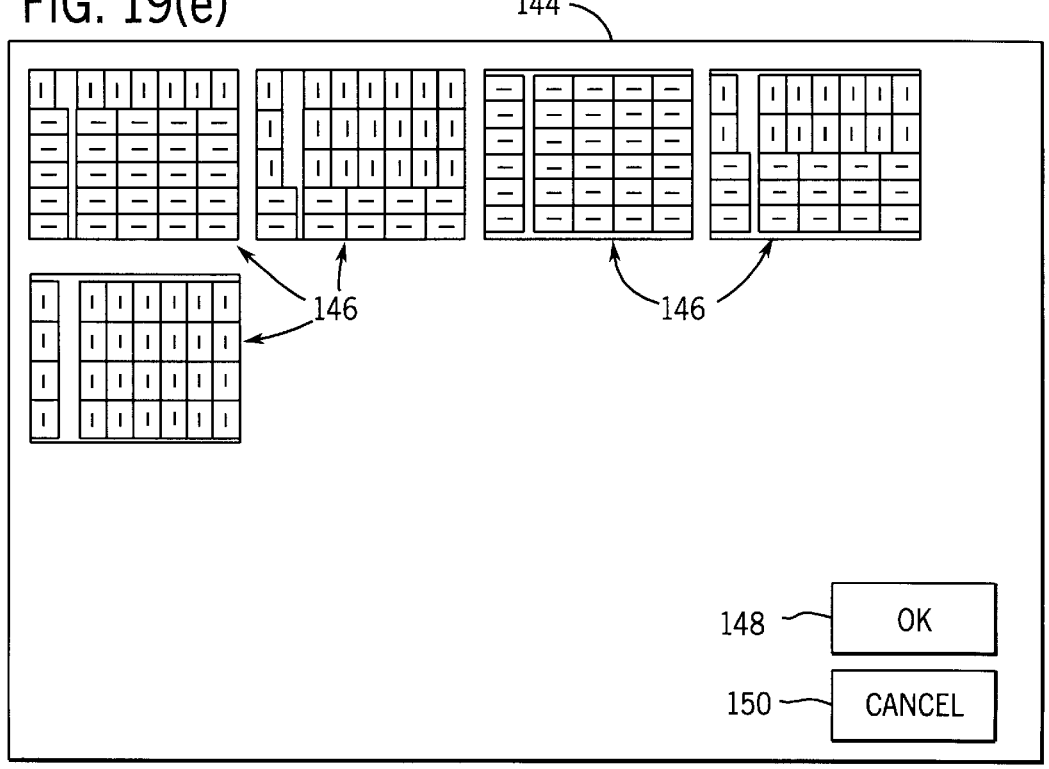

To initially construct the tiers, a touch sensitive add tier switch 142, FIG. 19(d), is provided, and when activated, produces a tiers available screen 144, FIG. 19(e). The tiers available screen 144 provides a visual representation of a plurality of possible tier configurations 146 which are generated based on the article size, the total number of articles desired, and the selected pallet type. The tiers available screen 144 also includes a touch sensitive approval switch 148, and a cancel switch 150, which when either are activated returns the system to the tiers-in-use screen 140, FIG. 19(d). While in the tiers available screen 144, FIG. 19(e), an operator can select desired tier configurations 146 which will appear in the tiers-in-use screen 140, FIG. 19(d), after activating the approval switch 148, FIG. 19(e).

Figure 19F:
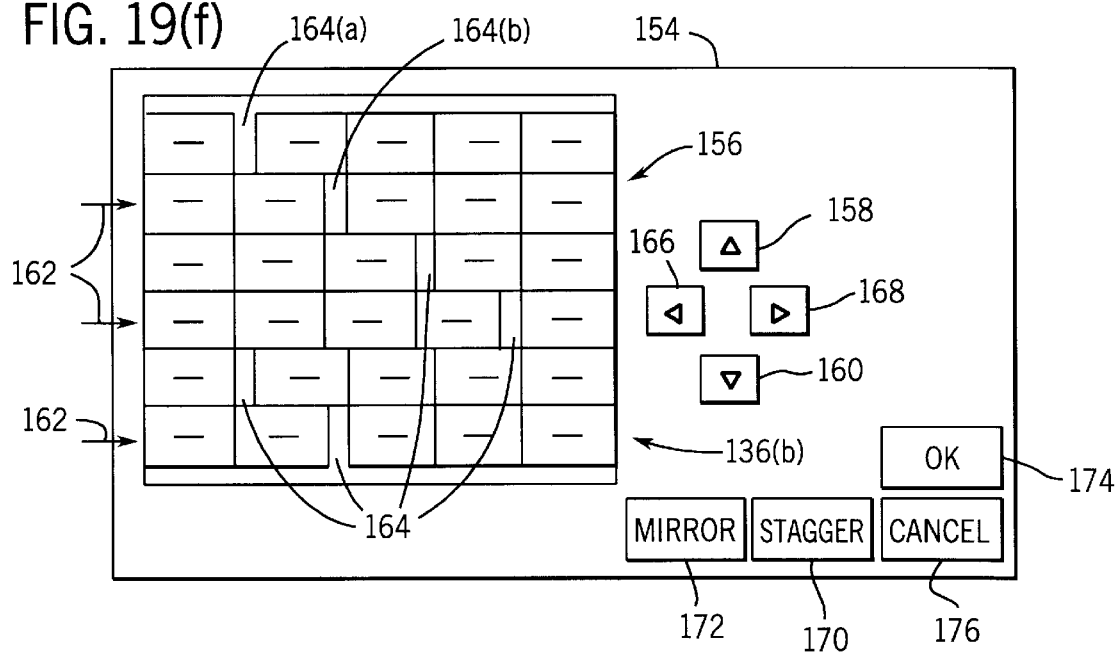

After certain tier configurations 136 are chosen, an operator can select a given tier configuration 136(b) and activate a touch sensitive edit tier switch 144 to produce edit tier screen 154, FIG. 19(f). In the edit tier screen 154, an operator can highlight a given row 156 and switch the positions of the given row 156 with the row above the given row by activating a touch sensitive up switch 158, or exchange positions with a row under the given row 156 by activating a touch sensitive down switch 160, which in effect changes the location of spaces 164. The spaces 164 can also be moved laterally within a row 162 by the use of a touch sensitive left switch 166 or a touch sensitive right switch 168. Alternatively, the activation of a touch sensitive stagger switch 170 automatically staggers the spaces 164 to produce the staggered space configuration shown in FIG. 19(f). A mirror image of a tier configuration can be produced by activating a touch sensitive mirror switch 172. When an operator completes the editing of a tier configuration in the edit tier screen 154, either a touch sensitive approval switch 174 is selected, in which case the modified tier is entered into the tiers-in-use screen 140, FIG. 19(d), or a touch sensitive cancel switch 176 can be activated wherein no change occurs to the tiers-in-use screen 140.

Referring to the tiers-in-use screen 140 of FIG. 19(d), an operator can also remove tiers by activating a touch sensitive remove tier switch 178, or copy an existing tier by activating a touch sensitive copy tier switch 180. The operator can exit the tiers-in-use screen 140 and return to the review pallet screen 132 by either activating the touch sensitive approval switch 182, thereby entering those changes into the view pallet screen 132, or activating a touch sensitive cancel switch 184 to ignore any changes made.

Referring back to the view pallet screen 132 of FIG. 19(b), a unit configuration 134 is constructed by touching selected tier configurations 136. In the particular arrangement shown in FIG. 19(b), the unit configuration 134 is constructed of alternately layered tier configurations 136(a) and 136(b). In this manner, none of the spaces 164 are aligned in adjacent tiers. Also, the tier configuration 134 has base dimensions substantially equal to that of the selected pallet type 186. Tie sheets can be added between any of the tier configurations 136 by activating a touch sensitive add tie sheet switch 188. Any of the tiers can be removed by activating a touch sensitive remove tier switch 190. The unit configuration 134 can be rotated about an axis point in the center of unit configuration 134 by the use of a set of touch sensitive rotation switches 194. The view pallet screen 132 also includes an output of certain calculated parameters for the unit configuration 134, such as the total items 196 in the unit 134, the total articles 198 in the unit, the total height 200 of the unit, and the total weight 202 of the unit. A touch sensitive print switch 204 is provided to print the view pallet screen 132. A touch sensitive approval 206 enters the changes made and returns the program to the main order entry screen 50, FIG. 19(a). A touch sensitive cancel switch 208, FIG. 19(b), ignores all changes made, and also returns the system to the main order entry screen 50 of FIG. 19(a).

FIG. 20 shows a top plan view of a tier 210 deposited on a pallet 212. Tier 210 is shown constructed of rotated articles 214 and unrotated articles 216. In the preferred embodiment, articles 214 and 216 are bundles of paperboard, but as previously explained, can also comprise any rectangular-shaped article. FIG. 20 shows a tier 210 having five rows 162. Two of the rows are rows of rotated articles 162(a) and the other three are rows of unrotated articles 162(b).

In accordance with the invention, rotated articles 214 are placed on pallet 212 having a length equal to the pallet length. In order to maintain this equality, it may be necessary to form a gap 218. Similarly, unrotated articles 216 are placed on pallet 212 to have a length equal to the pallet length and may therefore form a gap 220. Each succeeding tier 210 on pallet 212 will have gaps 218 and 220 staggered in a manner that the gaps in one tier are not aligned with the gaps of any adjacent tier. An edge offset 222 is provided on each side of the pallet width for centering the unit on the pallet. An edge gap 223 can be optionally provided to offset the unit from the pallet and avoid damaging the product if desired for centering products. The edge gap defaults to zero, as shown in FIG. 20, but can be set other than zero by an operator. The edge gap 223 is then used to determine gaps 218 and 220.

FIG. 21 shows a perspective view of a unit 224 constructed according to the present invention having multiple tiers 210. Unit 224 has tie sheets 226 placed between selected tiers 210. Unit 224 is shown on pallet 212 having gaps 218,220 alternately arranged such that no two gaps are aligned in an adjoining tier. Unit 224 is exemplary of a unit constructed in the stacking station 10, FIG. 1, and discharged from stack discharge conveyor 44.

Figure 22:
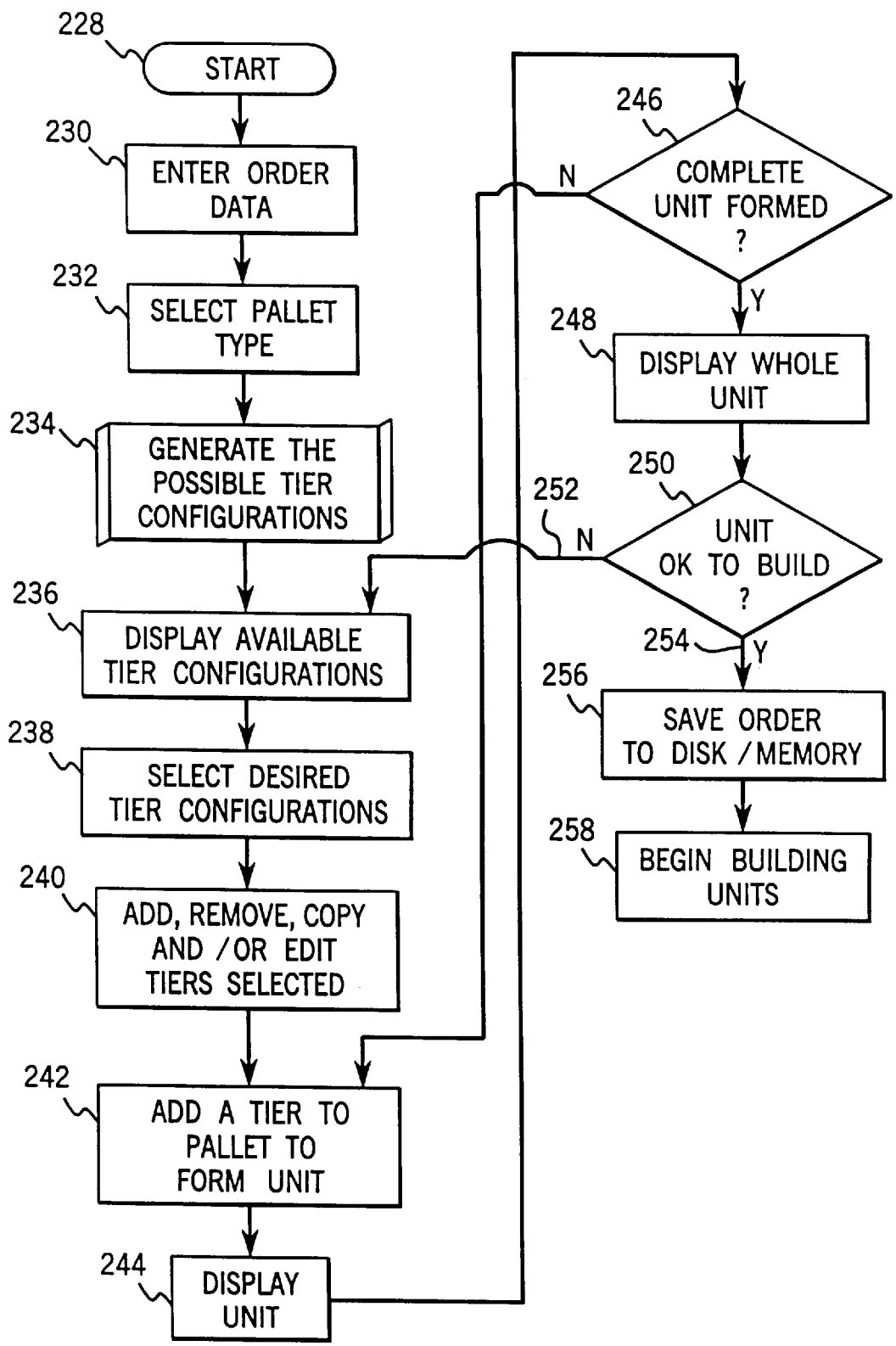
FIG. 22 is a flow chart of the optimizing and palletizing system of the present invention.
Figure 23A:
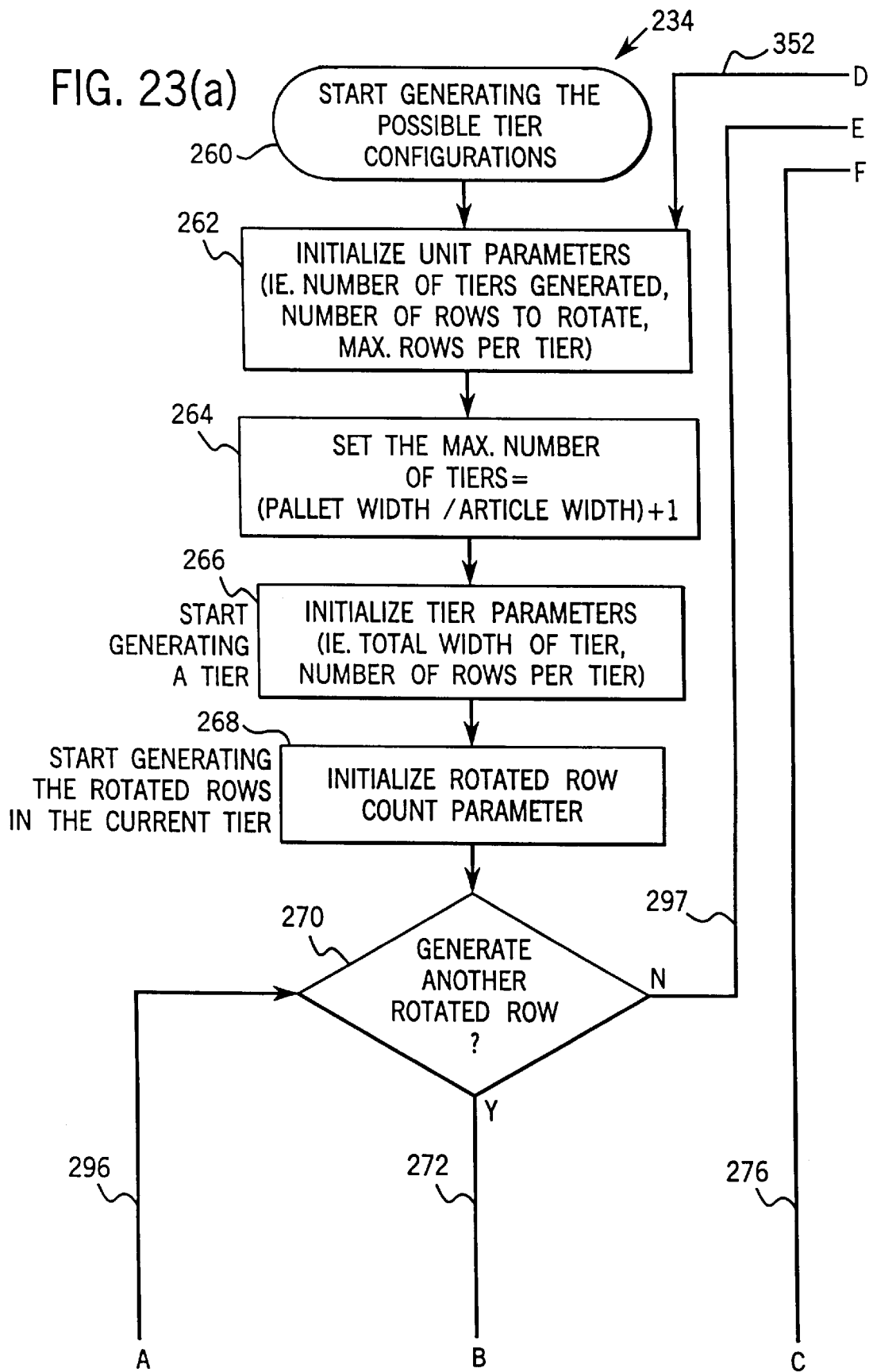
FIGS. 23(a)–(e) are a detailed flow chart of a portion of FIG. 22.
Figure 23B:
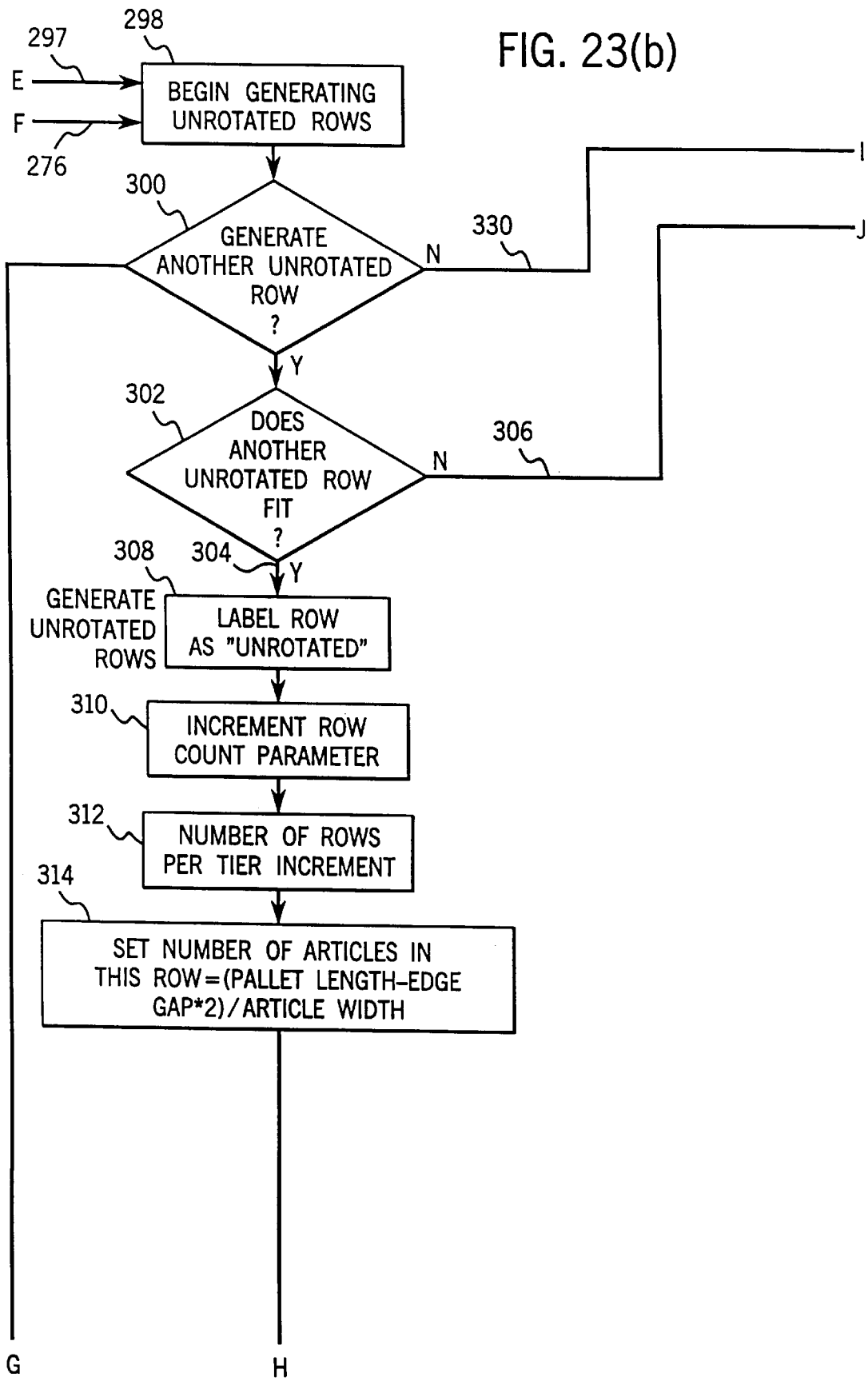
Figure 23C:
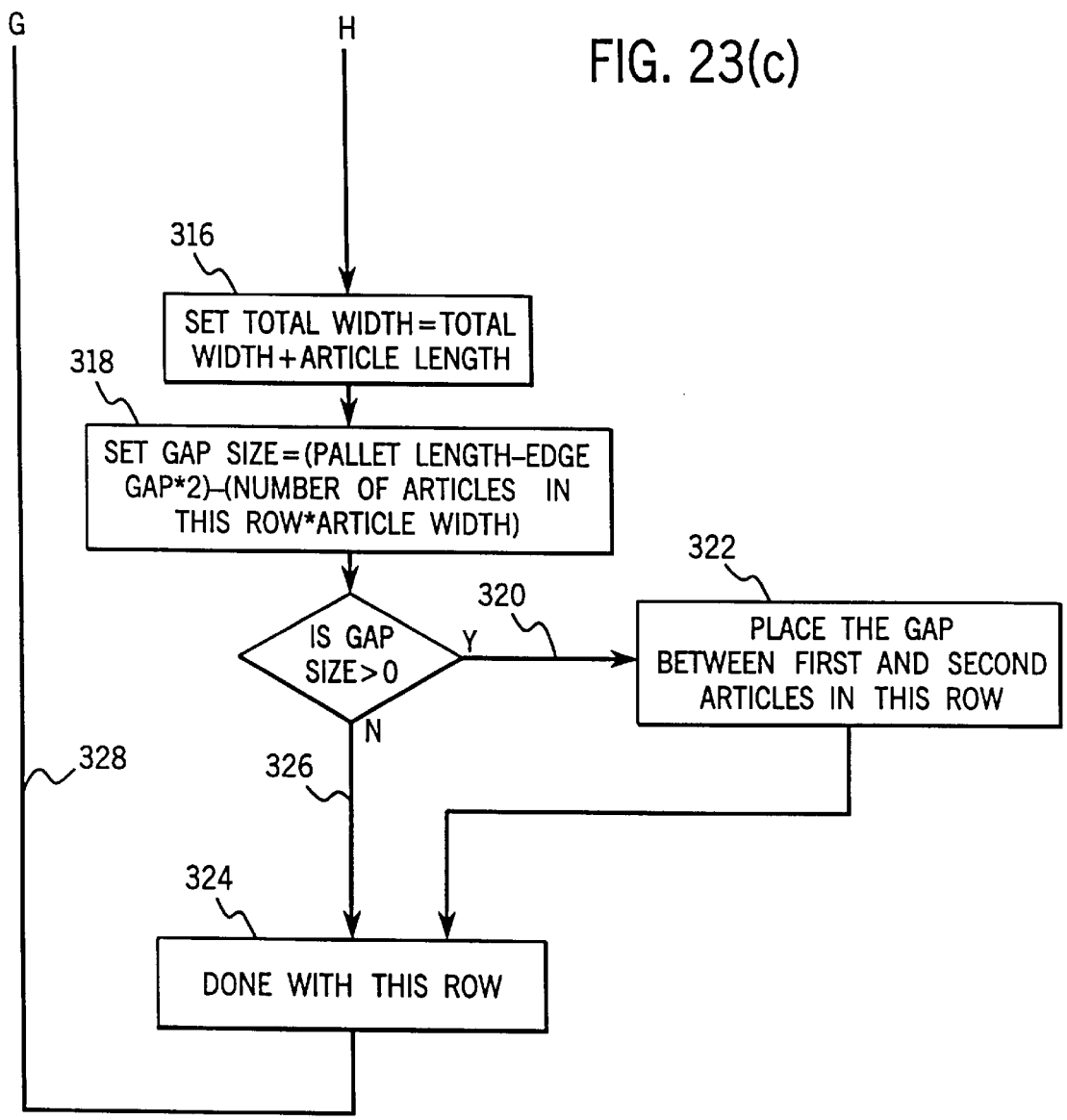
Figure 23D:
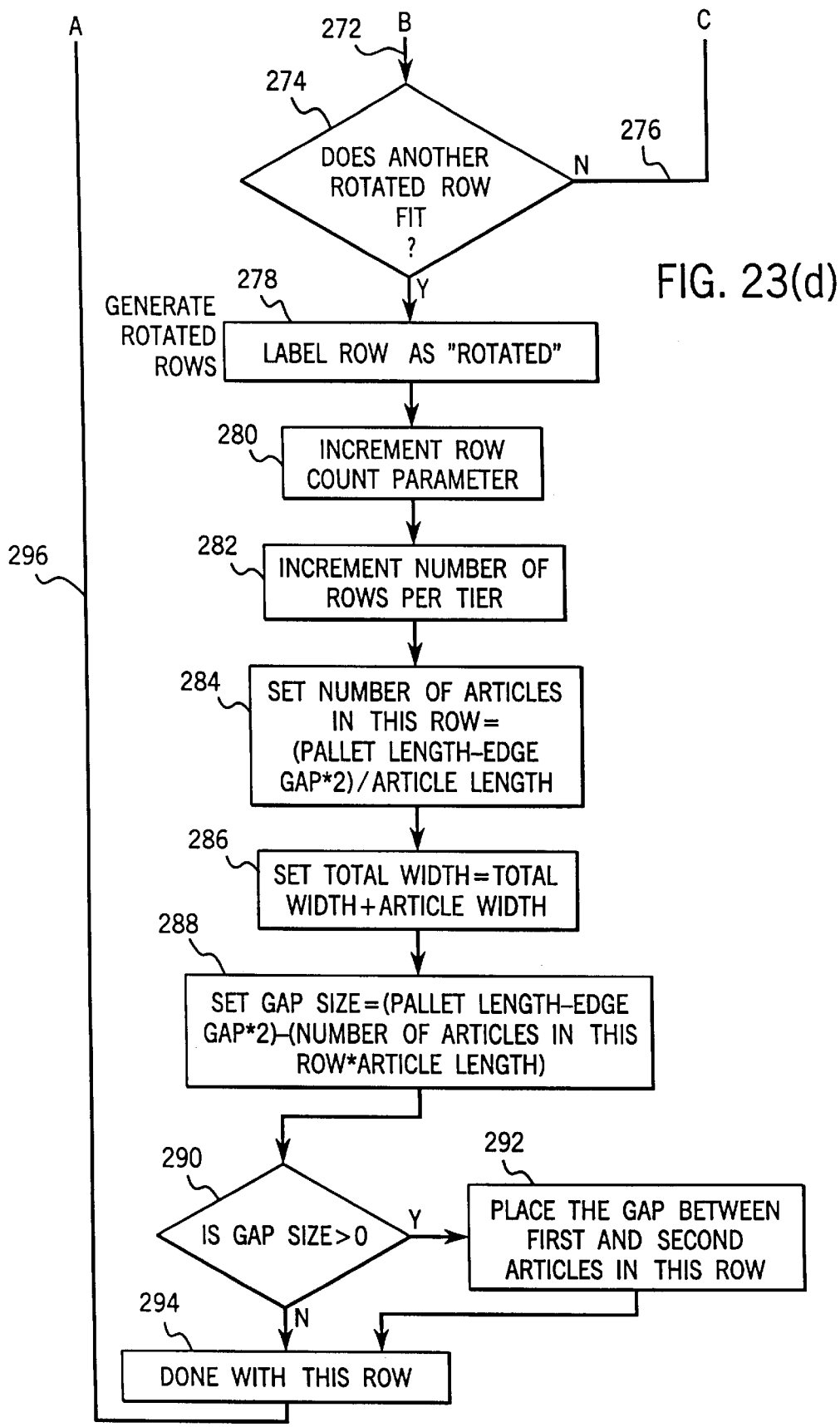
Figure 23E:
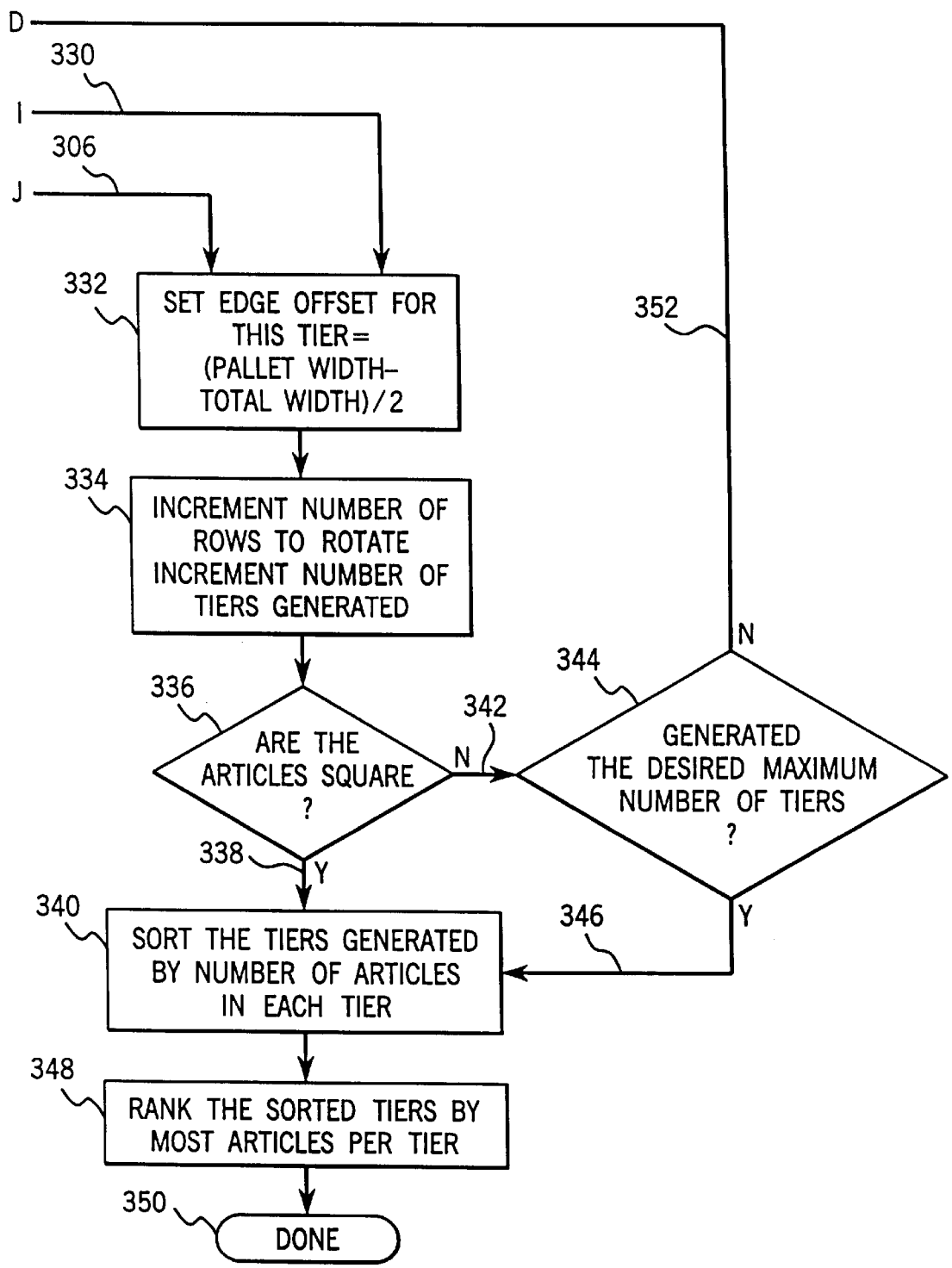

Referring to FIG. 22, a flow chart of the optimizing and palletizing system of the present invention is shown. This system begins at 228 wherein computer 45 is powered up. An operator then enters the data for a given order 230 through keyboard 6 and touch sensitive monitor screen 9, as shown in FIGS. 1 and 19. The order data to be entered is consistent with the main order entry 50 of FIG. 19(a). Such data include the article length and width, the total number of layered items, the layered item grade, whether the layered items have corner rounding, the maximum weight and height for a given pallet, and the maximum number of layered items per pallet. The order data can also include the optional edge gap 223 of FIG. 20, otherwise the edge gap defaults to zero. Similarly, a desired pallet type is selected 232, and the computer program then generates the possible tier configurations 234. The algorithm for generating the possible tier configuration 234 is later set forth with reference to FIG. 23.

At the conclusion of generating the possible tier configurations, the system displays the available tier configurations 236 on the computer monitor. An operator then selects the desired tier configurations 238 in accordance with the description of FIG. 19(e). Once the desired tier configurations are selected, an operator can add, remove, copy and/or edit the tiers selected at 240, and in accordance with FIGS. 19(d) and 19(f). The tiers selected are then added to the pallet to form a unit at 242 and the unit is displayed at 244, as shown in FIG. 19(b). If a complete unit is formed at 246, FIG. 22, then the entire unit is displayed at 248. Otherwise, another tier is added to the pallet at 242 and the system continues to form (242) and display the unit (244) until a complete unit is formed at 246 and the final unit is displayed at 248. An operator can then decide whether the displayed unit is satisfactory at 250. If not satisfactory 252, the system returns to displaying the available tier configurations at 236. On the other hand, if the unit is satisfactory 254, the parameters defining the order of articles are saved to a disk or memory 256 of the computer. The units can then be built at 258 in accordance with the palletizing system shown in FIGS. 1–15.

FIG. 23 shows the algorithm for generating the possible tier configurations 234 of FIG. 22. Referring to FIG. 23(a), the system begins generating the possible tier configurations 260 by initializing certain unit parameters 262. For example, a parameter corresponding to the number of tiers generated and a parameter corresponding to the number of rows to rotate are each initialized to zero. A parameter corresponding to the maximum rows per tier is initialized to 20. Next, the maximum number of tiers is set equal to the quotient of the pallet width by the article width, added to one at 264. To start generating a specific tier configuration, a set of tier parameters are initialized at 266. Specifically, a total width of a tier and a number of rows per tier parameters are each set to zero. Then the system begins to generate rotated rows for the current tier by initializing a rotated row count parameter to zero at 268.

A decision as to whether to generate another rotated row 270 is based upon whether the current row is less than the number of rows to be rotated, and whether the current row is less than the maximum rows per tier. If both are in the affirmative 272, then it is determined whether another rotated row will fit in a tier 274, FIG. 23(d). To determine if another rotated row will fit 274, the total width of the tier parameter is added to the article width parameter and checked to see if the sum is less than or equal to the pallet width parameter. If not 276, another rotated row will not fit, and the system begins to generate unrotated rows 298, FIG. 23(b).

Referring back to FIG. 23(d), to generate the rotated rows, the particular row is labeled "rotated" 278, and the row count and number of rows per tier parameters are incremented 280, 282. After which, the number of articles in this particular row is set equal to the pallet length less twice the edge gap size, divided by the article length at 284. The total width is then set equal to the last total width plus an additional article width 286. The gap size 218, 220 of FIG. 20, is set equal to the pallet length less twice the edge gap, less the product of the number of articles in this particular row being generated and the article length at 288. If the gap size is greater than zero 290, then the gap is placed between the first and second articles in this row at 292 and the row is completed 294. If the calculated gap size is not greater than zero at 290, then there is no gap in this particular row and the row is complete 294. The system returns 296 to deciding whether to generate another rotated row 270, FIG. 23(*a*), and if so, the previous description is repeated.

Once it is determined that no further rotated rows are to be generated at 270, 297, FIG. 23(*a*), the system begins to generate unrotated rows 298, FIG. 23(*b*). Initially, it is determined whether to generate another rotated row at 300 by checking to see if the current row is less than the maximum rows per tier. If so, and another unrotated row fits at 302 then another unrotated row is generated. To determine if another unrotated row fits at 302, the total width of the tier is added to the article length, and the sum is checked to see if it is less than or equal to the pallet width. If it is 304, then another unrotated row will fit. Conversely, another unrotated row will not fit if the total width of a tier plus the article length is greater than the pallet width 306. To generate another unrotated row 304, the current row is labeled "unrotated" 308 and the row count and rows per tier parameters are incremented 310, 312. After which, the number of articles in this row is set equal to the ratio of the pallet length less twice the edge gap, over the article width 314. The total width is then set equal to the last total width plus the present article length 316, FIG. 23(*c*). The gap size is then set equal to the difference between the pallet length less twice the edge gap and less the product of the number of articles in this row and the article width 318. If the gap size is found greater than zero 320, the gap is placed between the first and second articles in this row 322 and the row is complete 324. Conversely, if the gap size is not greater than zero 326, there is no gap and the row is complete 324.

When the row is completed 324, 328, another check is made as to whether to generate another unrotated row at 300, FIG. 23(*b*). If so, the unrotated rows generation is repeated, as previously described. If no more unrotated rows are needed 330, or if another unrotated row does not fit 306, the edge offset for this tier is set equal to one-half the difference between the pallet width and the total width of the tier 332, FIG. 23(*e*). The number of rows to rotate, and the number of tiers generated parameters are incremented at 334. The articles are then checked to see if they are square at 336; that is, whether the article length is equal to the article width, and if so 338, the tiers generated are sorted by the number of articles in each tier 340. If the articles are not square 342, then it is necessary to check whether the desired maximum number of tiers have been generated 344, and if so 346, then the tiers are sorted by the number of articles in each tier 340. The tiers are then ranked by the most articles in each tier 348 and the process of generating the possible tier configurations is completed 350. On the other hand, if the desired maximum number of tiers have not been generated 344, 352 the entire process is repeated by initializing the unit parameters 262, FIG. 23(*a*).

Therefore, the present invention includes a method of optimizing and automatically forming a desired number of articles into horizontal tiers, and the horizontal tiers being formed into a rectangular unit with base dimensions substantially similar to those of a chosen pallet type, as shown with particular reference to FIG. 21. The method comprises the steps of inputting a length and width of a single article and a total number of articles desired into a programmed computer as shown in FIGS. 19 and 22. The method further comprises selecting a pallet type from a list of standard pallet types stored in the memory of the programmed computer, also as shown with reference to FIGS. 19 and 22.

The method also includes generating a plurality of possible tier configurations based on the length and width of a single article, the total number of articles desired, and the pallet type selected as specified with reference to FIG. 23. The method further includes selecting at least one tier configuration and stacking multiple selected tier configurations to form a unit configuration, and forming an actual unit of articles based on the unit configuration, wherein the actual unit has base dimensions substantially similar to those of the selected pallet type. The actual unit is formed in accordance with FIGS. 1–15.

The method also comprises ranking the possible tier configurations based on a number of articles in a tier according to FIG. 23 and visually displaying the possible tier configurations on a monitor in accordance with FIG. 19, along with permitting an operator to select a displayed tier configuration to form a unit, and thereafter visually displaying the formed unit configuration on the monitor prior to actually building a unit, as shown in accordance with FIG. 19.

This method also allows an operator to edit any particular tier configuration prior to having to select a tier configuration. Also, the step of generating the possible tier configurations can further include rotating a given number of articles to form a row of rotated articles and selectively spacing a rotated article within the row of rotated articles, and selectively spacing unrotated articles within the rows of unrotated articles.

The spacing is such that horizontal asymmetrically different tiers can be formed on opposites side of a stack forming station, and the horizontally asymmetric tiers are alternately transferred from the opposite side and into the stack forming station such that the selected spacing between articles in each tier are not aligned with any selective spacing of a previous tier and a subsequent tier.

It is recognized that equivalence, alternatives, and modifications are possible and within the scope of the appending claims.

We claim:

1. A computer implemented palletizing system for optimizing an arrangement of articles into tiers, and the tiers into at least one unit for shipping on a pallet comprising:

a computer programmed to receive an article size, a total number of articles desired, and a selected pallet type to arrange the articles into horizontal tiers, the computer further programmed to generate a plurality of possible tier configurations each having base dimensions substantially equal to the base dimensions of the selected pallet type, and thereafter vertically stacking selected tier configurations to form a rectangular-shaped unit configuration;

a computer monitor connected to the computer for displaying the possible tier configurations and the unit configuration;

input means for an operator to enter a length and width of an article and a total number of articles desired, and wherein the computer monitor has an input means to select a standard pallet type, and wherein the computer generates possible tier configurations based upon the length and width of the article, the total number of articles desired, and the pallet type selected;

said computer further including means for generating rotated rows of articles and unrotated rows of articles and providing spacing between selected articles within the rows when necessary to cause the length of a row to substantially equal the length of the selected pallet type; and, a palletizer connected to the computer for building at least one unit of articles consistent with the unit configuration, the palletizer comprising a stack forming station in which tiers of articles are sequentially deposited, a tier forming station in which tiers of articles are formed from individually formed rows of articles, and a transfer device for moving the formed tiers to the stack forming station.

2. The system of claim 1 wherein the computer is further programmed to misalign the spacing of articles in one tier with the spacing of articles in an adjoining tier.

3. The system of claim 1 wherein the palletizer further comprises:

a first tier forming station in which first tiers of articles are formed;

a second tier forming station in which second tiers of articles are formed; and, wherein the transfer device alternately moves a first tier of articles and a second tier of articles into the stack forming station to provide a sequentially deposited stack of tiers.

4. The system of claim 1 wherein said means for generating rows of articles comprises an in-feed conveyor operatively connected to the computer and the tier forming station for spacing articles within the rows.

5. The system of claim 4 wherein said means for generating rows of articles further comprises an article orienting device operatively connected to the computer and the in-feed conveyor for rotating articles to form rotated rows of articles.

6. A system for optimizing a desired number of articles into rows, the rows into horizontal tiers, and the horizontal tiers into at least one rectangular multi-tier unit of size corresponding to a standard pallet type comprising:

means for inputting a base size of an article and a total number of articles ordered;

means for selecting a pallet type from a list of standard pallet types;

means for generating a plurality of possible tier configurations based on the base size of the articles, the total number of articles ordered, and the selected pallet type, and further including means for rotating a given number of articles to form a row of rotated articles, means for selectively spacing a rotated article within the row of rotated articles, means for forming a row of unrotated articles, and means for selectively spacing an unrotated article within the row of unrotated articles;

means for selecting a tier configuration from the generated plurality of possible tier configurations;

means for stacking selected tier configurations to form a rectangular unit configuration;

means for forming a tier of articles corresponding to the selected tier configuration; and, means for sequentially depositing formed tiers of articles in a unit forming station to form a unit corresponding to the unit configuration.

7. The system of claim 6 wherein the means for forming tiers of articles is further defined to form every second tier horizontally asymmetrically different from a previously formed tier, and the means for sequentially depositing formed tiers of articles is further defined to deposit tiers such that each tier is horizontally asymmetrically different with respect to an adjoining tier.

8. The system of claim 6 wherein the means for forming tiers of articles comprises:

a first tier forming station in which first tiers of articles are formed;

a second tier forming station in which second tiers of articles are formed; and, the means for sequentially depositing formed tiers of articles alternately moves a first tier and a second tier into a stack forming station to form a sequentially deposited stack of tiers.

9. The system of claim 6 further comprising:

means for ranking the possible tier configurations based on a number of articles in a tier;

means for displaying a visual representation of the possible tier configurations on a monitor;

means for permitting operator selection of displayed possible tier configurations to form a unit configuration; and, means for displaying a visual representation of the unit configuration on the monitor prior to forming an actual unit.

10. The system of claim 9 further comprising means for permitting the operator to change a tier configuration prior to the step of operator selection.

11. The system of claim 6 further comprising:

a means for forming horizontally asymmetrically different tiers on opposite sides of a stack forming station; and, a means for alternately transferring the horizontal asymmetrically different tiers from the opposite sides into the stack forming station such that the selective spacing between stacks in each tier are misaligned with the selective spacing of previous and subsequent tiers.

12. A method for optimizing and automatically forming a desired number of articles into rows, forming said rows into horizontal tiers, and forming said horizontal tiers into at least one multi-tier rectangular unit, said rectangular unit having base dimensions substantially similar to those of a chosen pallet type, said method comprising the steps of:

inputting a length and width of a single article and a total number of articles desired into a programmed computer;

selecting a pallet type of a given length and width from a listing of standard pallet types stored in a memory of the programmed computer;

generating a plurality of possible tier configurations based on the length and width of a single article, the total number of articles desired, and the length and width of the pallet type selected;

said generating step comprising rotating a given number of articles to form a row of rotated articles;

selectively spacing a rotated article within the row of rotated articles if necessary to make the length of said row equal to the length of said pallet;

forming a row of unrotated articles; and selectively spacing an unrotated article within the row of unrotated articles if necessary to make the length of said row equal to the length of said pallet;

selecting at least one tier configuration and stacking multiple selected tier configurations to form a unit configuration; and, forming an actual a unit of articles based on the unit configuration, wherein the actual unit has base dimensions substantially similar to those of the selected pallet type.

13. The method of claim 12 further comprising the steps of:

ranking the possible tier configurations based on a number of articles in a tier;

displaying a visual representation of the possible tier configurations on a monitor;

permitting operator selection of displayed possible tier configurations to form a unit configuration; and, displaying a visual representation of the formed unit configuration on the monitor prior to forming an actual unit.

14. The method of claim 13 further comprising the step of permitting the operator to edit a tier configuration prior to the step of operator selection.

15. The method of claim 12 further comprising the steps of:

forming horizontal asymmetrically different tiers on opposite sides of a stack forming station; and, alternately transferring the horizontal asymmetrically different tiers from the opposite sides into the stack forming station such that the selective spacing between articles in each tier are misaligned with the selective spacing of articles in a previous tier and a subsequent tier.

* * * * *